United States Patent [19]

Mayo et al.

[11] Patent Number: 5,206,359

[45] Date of Patent: * Apr. 27, 1993

[54] PROCESSES FOR PREPARATION OF TITANYL PHTHALOCYANINES TYPE X

[75] Inventors: James D. Mayo, Toronto; James M. Duff, Mississauga; Trevor I. Martin, Burlington; Terry L. Bluhm, Oakville; Cheng K. Hsiao; Ah-Mee Hor, both of Mississauga, all of Canada

[73] Assignee: Xerox Corporation, Stamford, Conn.

[*] Notice: The portion of the term of this patent subsequent to Nov. 17, 2009 has been disclaimed.

[21] Appl. No.: 683,935

[22] Filed: Apr. 11, 1991

[51] Int. Cl.⁵ .............................................. C09B 67/12
[52] U.S. Cl. ................................... 540/141; 540/140; 540/142; 540/143; 430/58; 430/59
[58] Field of Search ................ 540/141, 140, 142, 143

[56] References Cited

U.S. PATENT DOCUMENTS

| | | | |
|---|---|---|---|
| 3,825,422 | 7/1974 | Gruber et al. | 96/1 PE |
| 3,927,026 | 12/1975 | Brach et al. | 260/314.5 |
| 4,443,528 | 4/1984 | Tamura et al. | 430/56 |
| 4,458,004 | 7/1984 | Tanakawa | 430/270 |
| 4,536,461 | 8/1985 | Nakatani et al. | 430/58 |
| 4,607,124 | 8/1986 | Kazmaier et al. | 564/307 |
| 4,643,770 | 2/1987 | Hays | 106/23 |
| 4,664,997 | 5/1987 | Suzuki et al. | 430/58 |
| 4,701,396 | 10/1987 | Hung et al. | 430/58 |
| 4,725,519 | 2/1988 | Suzuki et al. | 430/58 |
| 4,728,592 | 3/1988 | Ohaku et al. | 430/59 |
| 4,771,133 | 9/1988 | Liebermann et al. | 540/143 |
| 4,777,251 | 10/1988 | Tanaka et al. | 540/143 |
| 4,882,427 | 11/1989 | Enokida et al. | 540/141 |
| 4,898,799 | 2/1990 | Fujimaki et al. | 430/59 |

FOREIGN PATENT DOCUMENTS

| | | |
|---|---|---|
| 0180930 | 5/1986 | European Pat. Off. . |
| 0314100 | 3/1989 | European Pat. Off. . |
| 0384470 | 8/1990 | European Pat. Off. . |
| 405420 | 1/1991 | European Pat. Off. . |
| 209776 | 11/1990 | Japan . |

OTHER PUBLICATIONS

CRC Handbook of Chemistry and Physics, pp. C381, C-529, C-530, C-532 (1984).
The "Phthalocyanines" vol. II by Moser et al. pp. 33–34 (1983).
Japanese abstract 256867 (1987).
Japanese abstract 256866 (1989).
Japanese abstract 307144 (1991).

*Primary Examiner*—Thurman K. Page
*Assistant Examiner*—Jyothsna Venkat
*Attorney, Agent, or Firm*—E. O. Palazzo

[57] ABSTRACT

A process for the preparation of titanyl phthalocyanine which comprises the treatment of titanyl phthalocyanine Type X with a halobenzene.

39 Claims, 6 Drawing Sheets

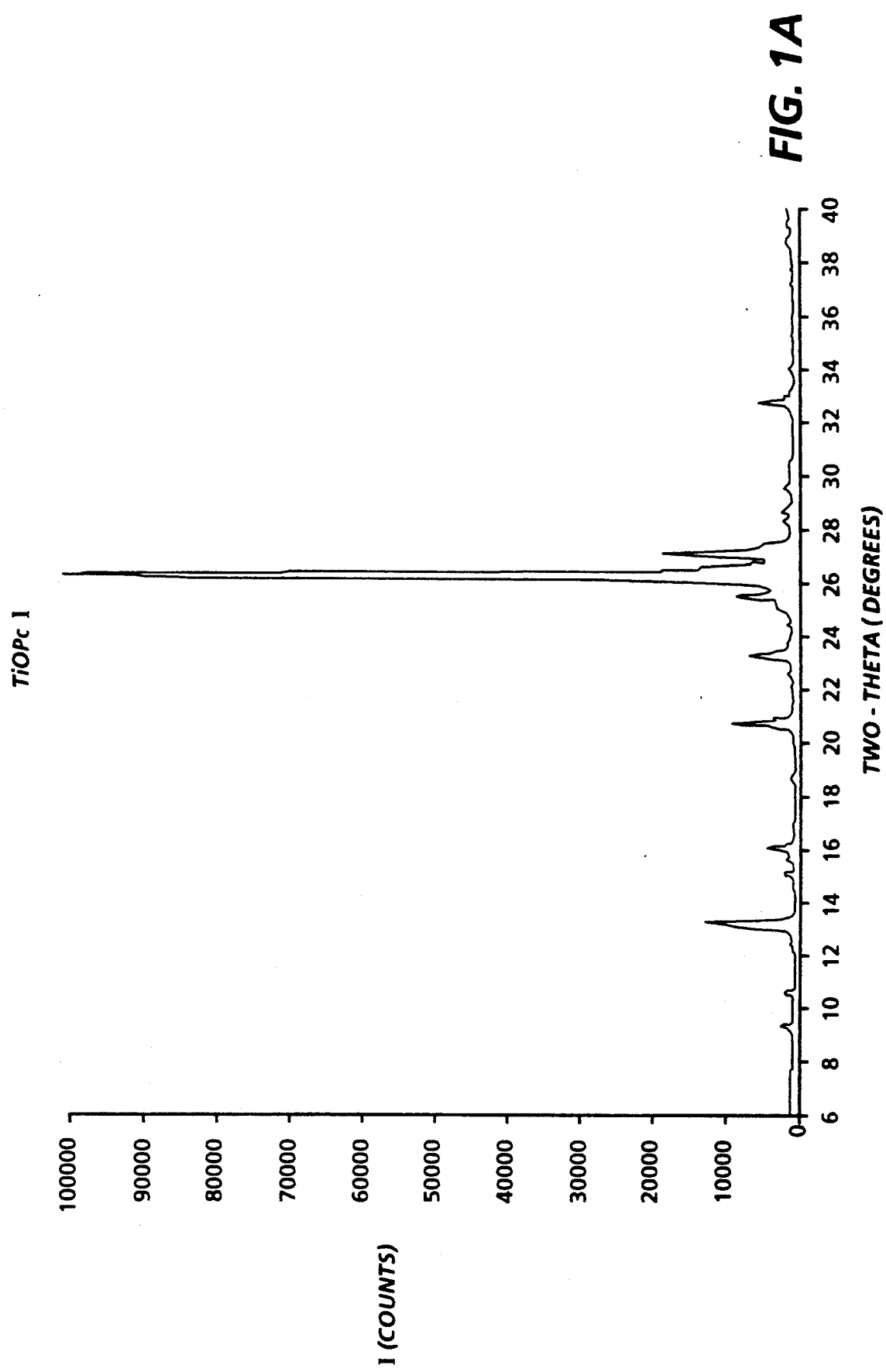

PROCESSES FOR PREPARATION OF TITANYL PHTHALOCYANINES TYPE X

BACKGROUND OF THE INVENTION

This invention is generally directed to titanyl phthalocyanines and processes for the preparation thereof, and more specifically the present invention is directed to processes for obtaining titanyl phthalocyanine polymorphs or crystal forms, including the known Type I and Type IV, reference for example U.S. Pat. No. 4,898,799, the disclosure of which is totally incorporated herein by reference, and layered photoconductive members comprised of the aforementioned titanyl phthalocyanine polymorphs, especially the Type IV. In an embodiment, the present invention is directed to a process for the preparation of titanyl phthalocyanine which comprises the treatment of titanyl phthalocyanine Type X with a halobenzene. In another embodiment, the present invention is directed to a process for the preparation of titanyl phthalocyanines by the reaction of titanium tetra(alkoxide), especially the butoxide, with diiminoisoindolene and phthalonitrile in a solvent, such as N-methyl pyrrolidone, thereby enabling a crude titanyl phthalocyanine; and thereafter optionally subjecting the aforementioned crude product to purification by washing with, for example, dimethylformamide; dissolving the obtained titanyl phthalocyanine Type I in a solvent mixture of trihalo, especially trifluoroacetic acid and an alkylene halide, especially methylene chloride; precipitating the desired titanyl phthalocyanine polymorph Type X by, for example, adding with stirring the aforementioned mixture to a water-alcohol mixture; separating the product therefrom by, for example, filtration, and washing the product obtained with water and then an organic solvent, such as monochlorobenzene, to obtain titanyl phthalocyanine with improved photoconductor electrical performances as illustrated herein. Titanyl phthalocyanine Type IV can be obtained from the titanyl Type X by the treatment of Type X with a halobenzene, such as chlorobenzene, or fluorobenzene. The titanyl phthalocyanines, such as the known polymorph IV and the X form, can be selected as organic photogenerator pigments in photoresponsive imaging members containing charge, especially hole transport layers such as aryl amine hole transport molecules. The aforementioned photoresponsive imaging members can be negatively charged when the photogenerating layer is situated between the hole transport layer and the substrate, or positively charged when the hole transport layer is situated between the photogenerating layer and the supporting substrate. The layered photoconductive imaging members can be selected for a number of different known imaging and printing processes including, for example, electrophotographic imaging processes, especially xerographic imaging and printing processes wherein negatively charged or positively charged images are rendered visible with toner compositions of the appropriate charge. Generally, the imaging members are sensitive in the wavelength regions of from about 700 to about 850 nanometers, thus diode lasers can be selected as the light source. Titanyl phthalocyanines may also be selected as intense blue light stable colorants for use in coatings, such as paint, inks, and as near infrared absorbing pigments suitable for use as IR laser optical recording materials.

In one embodiment, the present invention is directed to a process for the preparation of Type IV titanyl phthalocyanines by the reaction of phthalonitrile and diiminoisoindolene with a titanium tetraalkoxide, such as titanium tetrapropoxide in the presence of a solvent followed by dissolving the Type I titanyl phthalocyanine obtained in trifluoroacetic acid and methylene chloride; separating the product by, for example, filtration; redispersing the product in an alcohol, such as methanol and thereafter filtering the product obtained; redispersing the titanyl phthalocyanine product obtained twice in hot, about 90° C. for example, water followed by filtration; and subsequently redispersing the titanyl phthalocyanine pigment in an organic solvent, followed by separation by filtration, and drying the purified product titanyl phthalocyanine IV in, for example, an oven at, for example, about 70° C.

Certain titanium phthalocyanine pigments have been known since at least the publication WW 2 (PB 85172 Fiat Final Report 1313, Feb. 1, 1948). However, unlike other phthalocyanines such as metal-free, copper, iron and zinc phthalocyanines, titanium phthalocyanines have had minimum commercial use. Specific titanyl phthalocyanines or oxytitanium phthalocyanines are known to absorb near-infrared light at about 800 nanometers and a number of such pigments have been illustrated in the prior art as materials for IR laser optical recording material, reference for example BASF German 3,643,770 and U.S. Pat. No. 4,458,004. The use of certain titanium phthalocyanine pigments as a photoconductive material for electrophotographic applications is known, reference for example British Patent Publication 1,152,655, the disclosure of which is totally incorporated herein by reference. Also, U.S. Pat. No. 3,825,422 illustrates the use of titanyl phthalocyanine as a photoconductive pigment in an electrophotographic process known as particle electrophoresis. Additionally, the utilization of certain titanyl phthalocyanines and substituted derivatives thereof in a dual layer electrographic device is illustrated in EPO 180931, May 14, 1986. Moreover, the use of tetra- and hexadeca-flourosubstituted titanyl phthalocyanine in an electrophotographic device is illustrated in U.S. Pat. No. 4,701,396. In Japanese Patent Publication 64-171771, August, 1986, there is illustrated the use of titanyl phthalocyanine, which has been treated with a hot solvent, in electrophotography. Further, in German 3,821,628 there is illustrated the utilization of certain titanyl phthalocyanines, and other pigments in electrophotography, and wherein the titanyl phthalocyanines have been purified primarily to reduce the level of ash, volatile contaminants and sodium to below specified levels.

In the aforementioned documents, although synthesis and certain processing conditions were generally disclosed for the preparation of the titanyl phthalocyanine pigments, it is believed that there is no reference to certain crystal phases or polymorphs of the pigment. As mentioned in the textbook Phthalocyanine Compounds by Moser and Thomas, the disclosure of which is totally incorporated herein by reference, polymorphism or the ability to form distinct solid state forms is well known in phthalocyanines. For example, metal-free phthalocyanine is known to exist in at least 5 forms designated as alpha, beta, pi, X and tau. Copper phthalocyanine crystal forms known as alpha, beta, gamma, delta, epsilon and pi are also described. These different polymorphic forms are usually distinguishable on the basis of differences in the solid state properties of the materials which can be determined by measurements, such as Differential Scanning Calorimetry, Infrared Spectroscopy, Ultraviolet-Visible-Near Infrared spectroscopy and, especially, X-Ray Powder Diffraction techniques. There appears to be general agreement on the nomenclature used to designate specific polymorphs of commonly used pigments such as metal-free and copper phthalocyanine. However, this does not appear to be the situation with titanyl phthalocyanines as different nomenclature is selected in a number of instances. For example, reference is made to alpha, beta, A, B, C, y, and m forms if TiOPc (titanyl phthalocyanine) with different names being used for the same form in some situations. It is believed that five main crystal forms of TiOPc are known, that is Types I, II, III, X, and IV.

More specifically, the aforementioned documents illustrate, for example, the use of specific polymorphs of TiOPc in electrophotographic devices. Three crystal forms of titanyl phthalocyanine, differentiated by their XRPDs, were specifically illustrated, identified as A, B, and C, which it is believed are equivalent to Types I, II, and III, respectively. In Japanese 62-256865 there is disclosed, for example, a process for the preparation of pure Type I involving the addition of titanium tetrachloride to a solution of phthalonitrile in an organic solvent which has been heated in advance to a temperature of from 160° to 300° C. In Japanese 62-256866, there is illustrated, for example, a method of preparing the aforementioned polymorph which involves the rapid heating of a mixture of phthalonitrile and titanium tetrachloride in an organic solvent at a temperature of from 100° to 170° C. over a time period which does not exceed one hour. In Japanese 62-256867, there is described, for example, a process for the preparation of pure Type II (B) titanyl phthalocyanine, which involves a similar method except that the time to heat the mixture at from 100° to 170° C., is maintained for at least two and one half hours. Types I and II, in the pure form obtained by the process of the above publications, apparently afforded layered photoresponsive imaging members with excellent electrophotographic characteristics.

In Mita EPO patent publication 314,100, there is illustrated the synthesis of TiOPc by, for example, the reaction of titanium alkoxides and diiminoisoindolene in quinoline or an alkylbenzene, and the subsequent conversion thereof to an alpha Type pigment (Type II) by an acid pasting process, whereby the synthesized pigment is dissolved in concentrated sulfuric acid, and the resultant solution is poured onto ice to precipitate the alpha-form, which is filtered and washed with methylene chloride. This pigment, which was blended with varying amounts of metal free phthalocyanine, could be selected as the charge generating layer in layered photoresponsive imaging members with a high photosensitivity at, for example, 780 nanometers.

In Sanyo-Shikiso Japanese 63-20365/86, reference is made to the known crystal forms alpha and beta TiOPc (Types II and I, respectively, it is believed), which publication also describes a process for the preparation of a new form of titanyl phthalocyanine, which is apparently not named. This publication appears to suggest the use of the unnamed titanyl phthalocyanine as a pigment and its use as a recording medium for optical discs. This apparently new form was prepared by treating acid pasted TiOPc (Type II form, it is believed) with a mixture of chlorobenzene and water at about 50° C. The resulting apparently new form is distinguished on the basis of its XRPD, which appears to be identical to that shown in FIG. 1 for the Type IV polymorph.

In U.S. Pat. No. 4,728,592, there is illustrated, for example, the use of alpha type TiOPc (Type II) in an electrophotographic device having sensitivity over a broad wavelength range of from 500 to 900 nanometers. This form was prepared by the treatment of dichlorotitanium phthalocyanine with concentrated aqueous ammonia and pyridine at reflux for 1 hour. Also described in the aforementioned patent is a beta Type TiOPc (Type I) as a pigment, which is believed to provide a much poorer quality photoreceptor.

In Konica Japanese 64-17066/89, there is disclosed, for example, the use of a new crystal modification of TiOPc prepared from alpha type pigment (Type II) by milling it in a sand mill with salt and polyethylene glycol. This pigment had a strong XRPD peak at a value of 2 theta of 27.3 degrees. This publication also discloses that this new form differs from alpha type pigment (Type II) in its light absorption and shows a maximum absorbance at 817 nanometers compared to the alpha type, which has a maximum at 830 nanometers. The XRPD shown in the publication for this new form is believed to be identical to that of the Type IV form previously described by Sanyo-Shikiso in JOP 63-20365. The aforementioned Konica publication also discloses the use of this new form if TiOPc in a layered electrophotographic device having high sensitivity to near infrared light of 780 nanometers. The new form is indicated to be superior in this publication to alpha type TiOPc (Type II). Further, this new form is also described in U.S. Pat. No. 4,898,799 and in a paper presented at the Annual Conference of Japan Hardcopy in July 1989. In this paper, this same new form is referred to as Type y, and reference is also made to Types I, II, and III as A, B, and C, respectively.

In the journal, Electrophotography (Japan) vol. 27, pages 533 to 538, Toyo Ink Manufacturing Company, there is disclosed, for example, alpha and beta forms of TiOPc (Types I and II, it is believed) and also this journal discloses the preparation of a Type m TiOPc, an apparently new form having an XRPD pattern which was distinct from other crystal forms. It is believed that this XRPD is similar to that for the Type III titanyl phthalocyanine pigment but it is broadened most likely as the particle size is much smaller than that usually found in the Type III pigment. This pigment was used to prepare photoreceptor devices having greater sensitivity at 830 nanometers than alpha or beta Type TiOPc (Type II or I, respectively).

In Mitsubishi Laid Open Japanese Application 90-269776, laid open date Nov. 5, 1990, the disclosure of which is totally incorporated herein by reference there is illustrated the preparation of titanyl phthalocyanines by the treatment of phthalocyanines, such as metal free, metal phthalocyanines, or their derivatives with solvents containing at least trifluoroacetic acid, or mixed solvents of trifluoroacetic acid and halogenated hydrocarbons such as methylene chloride. In Example I of this Japanese Laid Open Application the preparation of the C-form of TiOPc is described. Other forms obtained are described in Examples II and III.

Processes for the preparation of specific polymorphs of titanyl phthalocyanine, which require the use of a strong acid such as sulfuric acid, are known, and these processes, it is believed, are not easily scalable. One process as illustrated in Konica Japanese Laid Open on Jan. 20, 1989 as 64-17066 (U.S. Pat. No. 4,898,799 appears to be its equivalent), the disclosures of which are totally incorporated herein by reference, involves, for example, the reaction of titanium tetrachloride and phthalodinitrile in 1-chloronaphthalene solvent to produce dichlorotitanium phthalocyanine which is then subjected to hydroylsis by ammonia water to enable the Type II polymorph. This phthalocyanine is preferably treated with an electron releasing solvent such as 2-ethoxyethanol, dioxane, N-methylpyrrolidone, followed by subjecting the alpha-titanyl phthalocyanine to milling at a temperature of from 50° to 180° C. In a second method described in the aforementioned Japanese Publication, there is disclosed the preparation of alpha type titanyl phthalocyanine with sulfuric acid. Another method for the preparation of Type IV titanyl phthalocyanine involves the addition of an aromatic hydrocarbon solvent to an aqueous suspension of Type II titanyl phthalocyanine prepared by the well-known acid pasting process, and heating the resultant suspension to about 50° C. as disclosed in Sanyo-Shikiso Japanese 63-20365, Laid Open in Jan. 28, 1988. In Japanese 171771/1986, Laid Open Aug. 2, 1986, there is disclosed the purification of metallophthalocyanine by treatment with N-methylpyrrolidone.

To obtain a TiOPc-based photoreceptor having high sensitivity to near infrared light, it is believed necessary to control not only the purity and chemical structure of the pigment, as is generally the situation with organic photoconductors, but also to prepare the pigment in the correct crystal modification. A number of the disclosed processes used to prepare specific crystal forms of Ti-OPc, such as Types I, II, III and IV are either complicated and difficult to control as in the preparation of pure Types I and II pigment by the processes described in Mitsubishi Japanese 62-25685, -6 and -7 involve harsh treatment such as sand milling at high temperature, reference Konica U.S. Pat. No. 4,898,799; or dissolution of the pigment in a large volume of concentrated sulfuric acid, a solvent which is known to cause decomposition of metal phthalocyanines, reference Sanyo-Shikiso Japanese 63-20365, and Mita EPO 314,100.

Generally, layered photoresponsive imaging members are described in a number of U.S. patents, such as U.S. Pat. No. 4,265,900, the disclosure of which is totally incorporated herein by reference, wherein there is illustrated an imaging member comprised of a photogenerating layer, and an aryl amine hole transport layer. Examples of photogenerating layer components include trigonal selenium, metal phthalocyanines, vanadyl phthalocyanines, and metal free phthalocyanines. Additionally, there is described in U.S. Pat. No. 3,121,006 a composite xerographic photoconductive member comprised of finely divided particles of a photoconductive inorganic compound dispersed in an electrically insulating organic resin binder. The binder materials disclosed in the '006 patent comprise a material which is incapable of transporting for any significant distance injected charge carriers generated by the photoconductive particles.

Photoresponsive imaging members with squaraine photogenerating pigments are also known, reference U.S. Pat. No. 4,415,639. In this patent there is illustrated a photoresponsive imaging member with a substrate, a hole blocking layer, an optional adhesive interface layer, an organic photogenerating layer, a photoconductive composition capable of enhancing or reducing the intrinsic properties of the photogenerating layer, and a hole transport layer. As photoconductive compositions for the aforementioned member, there can be selected various squaraine pigments, including hydroxy squaraine compositions. Moreover, there is disclosed in U.S. Pat. No. 3,824,099 certain photosensitive hydroxy squaraine compositions.

The use of selected perylene pigments as photoconductive substances is also known. There is thus described in Hoechst European Patent Publication 0040402, DE3019326, filed May 21, 1980, the use of N,N'-disubstituted perylene-3,4,9,10-tetracarboxyldiimide pigments as photoconductive substances. Specifically, there is, for example, disclosed in this publication N,N'-bis(3-methoxypropyl)perylene-3,4,9,10-tetracarboxyldiimide dual layered negatively charged photoreceptors with improved spectral response in the wavelength region of 400 to 700 nanometers. A similar disclosure is revealed in Ernst Gunther Schlosser, Journal of Applied Photographic Engineering, Vol. 4, No. 3, page 118 (1978). There are also disclosed in U.S. Pat. No. 3,871,882 photoconductive substances comprised of specific perylene-3,4,9,10-tetracarboxylic acid derivative dyestuffs. In accordance with the teachings of this patent, the photoconductive layer is preferably formed by vapor depositing the dyestuff in a vacuum. Also, there is specifically disclosed in this patent dual layer photoreceptors with perylene-3,4,9,10-tetracarboxylic acid diimide derivatives, which have spectral response in the wavelength region of from 400 to 600 nanometers. Also, in U.S. Pat. No. 4,555,463, the disclosure of which is totally incorporated herein by reference, there is illustrated a layered imaging member with a chloroindium phthalocyanine photogenerating layer. In U.S. Pat. No. 4,587,189, the disclosure of which is totally incorporated herein by reference, there is illustrated a layered imaging member with a perylene pigment photogenerating component. Both of the aforementioned patents disclose an aryl amine component as a hole transport layer.

Moreover, there are disclosed in U.S. Pat. No. 4,419,427 electrographic recording mediums with a photosemiconductive double layer comprised of a first layer containing charge carrier perylene diimide dyes, and a second layer with one or more compounds which are charge transporting materials when exposed to light, reference the disclosure in column 2, beginning at line 20.

In copending application U.S. Ser. No. 537,714 filed Jun. 14, 1990, the disclosure of which is totally incorporated herein by reference, there are illustrated photoresponsive imaging members with photogenerating titanyl phthalocyanine layers prepared by vacuum deposition. It is indicated in this copending application that the imaging members comprised of the vacuum deposited titanyl phthalocyanines and aryl amine hole transporting compounds exhibit superior xerographic performance as low dark decay characteristics result and higher photosensitivity is generated, particularly in comparison to several prior art imaging members prepared by solution coating or spray coating, reference for example, U.S. Pat. No. 4,429,029 mentioned hereinbefore.

In copending application U.S. Ser. No. 533,265 now U.S. Pat. No. 5,153,313, the disclosure of which is totally incorporated herein by reference, there is illustrated a process for the preparation of phthalocyanine composites which comprises adding a metal free phthalocyanine, a metal phthalocyanine, a metalloxy phthalocyanine or mixtures thereof to a solution of trifluoroacetic acid and a monohaloalkane; adding to the resulting mixture a titanyl phthalocyanine; adding the resulting solution to a mixture that will enable precipitation of said composite; and recovering the phthalocyanine composite precipitated product.

In copending application U.S. Ser. No. 533,261 now U.S. Pat. No. 5,166,339, the disclosure of which is totally incorporated herein by reference, there is illustrated a process for the preparation of titanyl phthalocyanine which comprises the reaction of titanium tetrapropoxide with diiminoisoindolene in N-methylpyrrolidone solvent to provide Type I, or $\beta$-type titanyl phthalocyanine as determined by X-ray powder diffraction; dissolving the resulting titanyl phthalocyanine in a mixture of trifluoroacetic acid and methylene chloride; adding the resulting mixture to a stirred organic solvent, such as methanol, or to water; separating the resulting precipitate by, for example, vacuum filtration through a glass fiber paper in a Buchner funnel; and washing the titanyl phthalocyanine product. Examples of titanyl phthalocyanine reactants that can be selected in effective amounts of, for example, from about 1 weight percent to about 40 percent by weight of the trifluoroacetic acidic solvent mixture include known available titanyl phthalocyanines; titanyl phthalocyanines synthesized from the reaction of titanium halides such as titanium trichloride, titanium tetrachloride or tetrabromide, titanium tetraalkoxides such as titanium tetra-methoxide, -ethoxide, -propoxide, -butoxide, -isopropoxide and the like; and other titanium salts with compounds such as phthalonitrile and diiminoisoindolene in solvents such as 1-chloronaphthalene, quinoline, N-methylpyrrolidone, and alkylbenzenes, such as xylene, at temperatures of from about 120° to about 300° C.; specific polymorphs of titanyl phthalocyanine such as Types I, II, III, and IV, the preparation of which, for example, is described in the literature; or any other suitable polymorphic form of TiOPc; substituted titanyl phthalocyanine pigments having from 1 to 16 substituents attached to the outer ring of the compound, said substituent being, for example, halogens such as chloro-, bromo-, iodo- and fluoro-, alkyls with from 1 to about 6 carbon atoms such as methyl-, ethyl-, propyl-, isopropyl-, butyl-, pentyl-, and hexyl-; nitro, amino, alkoxy and alkylthio, such as methoxy-, ethoxy- and propylthio- groups; and mixtures thereof.

As the solvent mixture, there can be selected a strong organic acid, such as a trihaloacetic acid, including trifluoroacetic acid or trichloroacetic acid, and a cosolvent, such as an alkylene halide, such as methylene chloride, chloroform, trichloroethylene, bromoform and other short chain halogenated alkanes and alkenes with from 1 to about 6 carbon atoms and from 1 to about 6 halogen atoms including chlorofluorocarbons and hydrochlorofluorocarbons; haloaromatic compounds such as chlorobenzene, dichlorobenzene, chloronaphthalene, fluorobenzene, bromobenzene, and benzene; alkylbenzenes such as toluene and xylene; and other organic solvents which are miscible with strong organic acids and which will effectively dissolve the titanyl phthalocyanine in effective amounts of, for example, a ratio of from about 1 to 50 parts of acid to about 50 parts of cosolvent such as methylene chloride. In an embodiment, solvent mixture is comprised of trifluoroacetic acid and methylene chloride in a ratio of from about 5 parts acid to about 95 parts methylene chloride to 25 parts acid to 75 parts of methylene chloride. Subsequent to solubilization with the above solvent mixture and stirring for an effective period of time of, for example, from about 5 minutes to several days, the resulting mixture is added to a solvent that will enable precipitation of the desired titanyl phthalocyanine polymorph, such as Type IV, which solvent is comprised of an alcohol such as an alkylalcohol including methanol, ethanol, propanol, isopropanol, butanol, n-butanol, pentanol and the like; ethers such as diethyl ether and tetrahydrofuran; hydrocarbons such as pentane, hexane and the like with, for example, from about 4 to about 10 carbon atoms; aromatic solvents such as benzene, toluene, xylene, halobenzenes such as chlorobenzene, and the like; carbonyl compounds such as ketones and aldehydes such as acetone, methyl ethyl ketone, and butyraldehyde; glycols such as ethylene and propylene glycol and glycerol; polar aprotic solvents such as dimethyl sulfoxide, dimethylformamide and N-methylpyrrolidone; and water, as well as mixtures of the aforementioned solvents, followed by filtration of the titanyl phthalocyanine polymorph, and washing with various solvents such as, for example, deionized water and an alcohol such methanol and the like, which serves to remove residual acid and any impurities which might have been released by the process of dissolving and reprecipitating the pigment. The solid resulting can then be dried by, for example, heating yielding a dark blue pigment of the desired titanyl phthalocyanine polymorph, the form of which was determined by the composition of the precipitant solvent. The polymorphic form and purity of the product was determined by XRPD analysis.

In working Examples II and IV of the aforementioned copending patent application U.S. Ser. No. 533,261 now U.S. Pat. No. 5,166,339, it being noted that the preparation of X titanyl phthalocyanine is described in Example III, there is disclosed the following. A 1 liter three-necked flask fitted with mechanical stirrer, condenser and thermometer maintained under an atmosphere of argon was charged with diiminoisoindolene (94.3 grams, 0.65 mole), titanium tetrabutoxide (55.3 grams, 0.1625 mole; Aldrich) and 650 milliliters of 1-chloronaphthalene. The mixture was stirred and warmed. At about 140° C. the mixture turned dark green and began to reflux. At this time the condenser was removed and the vapor (this was identified as n-butanol by gas chromatography) was allowed to escape until the reflux temperature reached 230° C. The reaction was maintained at about this temperature for one and one half hours then was cooled to 150° C. Filtration using a 1 liter sintered glass funnel and washing with boiling DMF, then methanol, provided 69.7 grams (74 percent yield) of blue pigment which was identified as Type I TiOPc by XRPD. Elemental analysis of the product was: C, 67.38; H, 2.78; N, 19.10; Ash, 13.61. TiOPC requires: C, 66.67; H, 2.80; N, 19.44; Ash, 13.61. A 20 milliliter aliquot of a solution of 10 grams of Type I TiOPc, prepared in N-methylpyrrolidone solvent in 100 milliliters of a mixture of trifluoroacetic acid in methylene chloride (1:4, v/v) was added over a 2 minute period to a rapidly stirred solution of methanol (45 milliliters) and water (135 milliliters). The resultant coarse suspension was stirred at room temperature for 35 minutes then was allowed to settle. The supernatant liquid was decanted and the blue residue was redispersed in 100 milliliters of methanol by stirring for 15 minutes. The suspension was filtered using a 7 centimeters diameter glass fiber filter in a porcelain funnel. The solid was washed in the funnel with 2×10 milliliter portions of methanol, 4×20 milliliter portions of deionized water and 2×10×20 milliliter portions of water and 2×10 milliliter portions of methanol. The solid was dried at 75° C. to yield 1.85 gram of blue pigment identified as Type IV TiOPc by XRPD.

Disclosed in copending patent application U.S. Ser. No. 661,978, now U.S. Pat. No. 5,164,493 is a process for the preparation of titanyl phthalocyanine Type I which comprises the addition in a solvent of titanium tetraalkoxide to a mixture of phthalonitrile and a diiminoisoindolene, followed by heating. The disclosure of this patent application is totally incorporated herein by reference.

Disclosed in copending applications U.S. Ser. No. 678,506, now allowed entitled "Process for the Preparation of Titanyl Phthalocyanines" with inventors James D. Mayo and Sandra J. Gardner, is a process for the preparation of titanyl phthalocyanine which comprises the reaction of a titanium tetraalkoxide and diiminoisoindolene in the presence of a halonaphthalene solvent; dissolving the resulting Type I titanyl phthalocyanine in a haloacetic acid and an alkylene halide; adding the resulting mixture slowly to a cold alcohol solution; and thereafter isolating the resulting Type X titanyl phthalocyanine with an average volume particle size diameter of from about 0.02 to about 0.5 micron; and U.S. Ser. No. 683,901 now allowed entitled "Titanium Phthalocyanines and Processes for the Preparation Thereof" with inventors James D. Mayo, Terry L. Bluhm, Cheng K. Hsiao, Trevor I. Martin and Ah-Mee Hor, is a process for the preparation of titanyl phthalocyanine Type I which comprises the reaction of titanium tetraalkoxide and diiminoisoindolene in the presence of a halonaphthalene solvent. The disclosures of each of the aforementioned copending patent applications are totally incorporated herein by reference.

The disclosures of all of the aforementioned publications, laid open applications, copending applications and patents are totally incorporated herein by reference.

SUMMARY OF THE INVENTION

It is a feature of the present invention to provide processes for the preparation of titanyl phthalocyanines with many of the advantages illustrated herein.

It is yet another feature of the present invention to provide processes for the preparation of titanyl Type IV phthalocyanines by the treatment of titanyl Type X with a halobenzene, such as chlorobenzene.

Another feature of the present invention relates to the preparation of titanyl phthalocyanine polymorphs, including those known as Type I, Type X, and Type IV.

Further, another feature of the present invention relates to the preparation of photogenerating titanyl phthalocyanines by the reaction of titanium tetrabutoxide with DI$^3$ and phthalonitrile in the presence of a solvent, such as N-methyl pyrrolidone, followed by dissolving the Type I titanyl phthalocyanine obtained; thereafter washing the product separated; and subsequently converting the Type X titanyl phthalocyanine to Type IV by the redispersion thereof in an organic solvent.

Additionally, another feature of the present invention relates to the preparation of titanyl phthalocyanine polymorphs, especially the Type IV, in acceptable yields of, for example, exceeding about 75 percent, and a high purity of, for example, about 99 percent in embodiments of the present invention.

Another feature of the present invention resides in a process for the preparation of Type X TiOPc, designated X-form.

Another feature of the present invention in an embodiment thereof resides in the preparation of TiOPc polymorphs, especially Type IV, under cold reprecipitation conditions as illustrated herein with a small particle size of about 0.05 to about 0.1 micron which is advantageous for the preparation of electrophotographic devices since, for example, the prepared polymorphs can be easily dispersed in coating compositions.

A further specific feature of the present invention resides in the provision of photoresponsive imaging members with an aryl amine hole transport layer, and a photogenerator layer comprised of titanyl phthalocyanine pigment obtained by the processes illustrated herein.

A further feature of the present invention resides in the provision of photoresponsive imaging members with an aryl amine hole transport layer, and a photogenerator layer comprised of the titanyl phthalocyanine pigments X-form, Type I, or Type IV.

These and other features of the present invention can be accomplished in embodiments thereof by the provision of processes for the preparation of titanyl phthalocyanines and photoresponsive imaging members thereof. More specifically, in one embodiment of the present invention there are provided processes for the preparation of titanyl phthalocyanine (TiOPc) polymorphs, which comprises the solubilization of a titanyl phthalocyanine Type I in a mixture of trihalo, especially trifluoroacetic acid and an alkylenehalide, especially methylene chloride, precipitation of the desired titanyl phthalocyanine, such as Type X, separation by, for example, filtration, and subjecting the Type X product to washing, and thereafter redispersing the Type X in water, followed by filtration and redispersing in an organic solvent, for example chlorobenzene, to obtain Type IV titanyl phthalocyanine. The product can be identified by various known means including X-ray powder diffraction (XRPD).

More specifically, in one embodiment of the present invention there are provided processes for the preparation of titanyl phthalocyanine (TiOPc) Type I polymorphs which comprise the reaction of a phthalonitrile, such as ortho-phthalonitrile, a diiminoisoindolene, such as 1,3-diiminoisoindolene (DI$^3$) with titanium tetraalkoxide, in the presence of a solvent. Subsequently, the Type I pigment obtained is dissolved in a mixture of trifluoroacetic acid and methylene chloride, and thereafter the aforementioned mixture is added to a solution comprised of an alcohol, such as methanol, and water; thereafter separating the product titanyl phthalocyanine from the aforementioned mixture by, for example, filtration; redispersing the product Type I obtained in an organic solvent, for example methanol, and then in hot water at least two times; separation of the Type X phthalocyanine; and thereafter dispersing the Type X obtained in a halobenzene, followed by separation of the product Type IV titanyl phthalocyanine.

In another embodiment, the process of the present invention comprises 1) the addition of 1 part titanium tetrabutoxide to a stirred solution of from about 1 part to about 10 parts and preferably about 4 parts of 1,3-diiminoisoindolene; 2) relatively slow application of heat using an appropriate sized heating mantle at a rate of about 1 degree per minute to about 10 degrees per minute and preferably about 5 degrees per minute until refluxing occurs at a temperature of about 130 degrees to about 180 degrees; 3) removal and collection of the resulting distillate, which was shown by NMR spectroscopy to be butyl alcohol, in a dropwise fashion using an appropriate apparatus, such as a Claisen Head condenser, until the temperature of the reactants is from about 190 degrees to about 230 degrees, and preferably about 200 degrees; 4) continued stirring at said reflux temperature for a period of about ½ hour to about 8 hours and preferably about 2 hours; 5) cooling of the reactants to a temperature of about 130 degrees to about 180 degrees and preferably about 160 degrees, by removal of the heat source; 6) filtration of the flask contents through, for example, an M-porosity (10 to 15 μm) sintered glass funnel which was preheated using a solvent which is capable of raising the temperature of said funnel to about 150 degrees; for example, boiling N,N-dimethylformamide in an amount sufficient to completely cover the bottom of the filter funnel so as to prevent blockage of said funnel; 7) washing the resulting purple solid by slurrying said solid in portions of boiling DMF either in the funnel or in a separate vessel in a ratio of about 1 to about 10, and preferably about 3 times the volume of the solid being washed, until the hot filtrate became light blue in color; 8) cooling and further washing the solid of impurities by slurrying said solid in portions of N,N-dimethylformamide at room temperature, about 25 degrees, approximately equivalent to about three times the volume of the solid being washed, until the filtrate became light blue in color; 9) washing the solid of impurities by slurrying said solid in portions of an organic solvent, such as methanol, acetone, water and the like, and in an embodiment methanol at room temperature, about 25 degrees, approximately equivalent to about three times the volume of the solid being washed, until the filtrate became clear and colorless; 10) oven drying the purple solid in the presence of a vacuum or in air at a temperature of from about 25 degrees to about 200 degrees and preferably about 70 degrees for a period of from about 2 hours to about 48 hours and preferably about 24 hours thereby resulting in the isolation of a shiny purple solid which was identified as being Type I titanyl phthalocyanine by its X-ray powder diffraction trace.

The Type I titanyl phthalocyanine obtained can then be converted to Type X titanyl phthalocyanine by the dissolution thereof in a trihalo, such as trifluoroacetic acid, and an alkylene halide, such as methylene chloride, and thereafter optionally reprecipitating the product obtained in a solvent mixture of, for example, methanol and water.

In an embodiment of the process of the present invention, the Type I titanyl phthalocyanine obtained can be converted to Type X by 1) dissolving 1 weight part of the Type I pigment in a ratio of from about 1 volume part to about 100 volume parts and in an embodiment about 10 volume parts of a solvent comprised of 1 volume part of a haloacetic acid, and in an embodiment trifluoroacetic acid, and from about 1 volume part to about 100 volume parts and preferably from about 1 volume part to about 10 volume parts and in an embodiment 4 volume parts of a cosolvent preferably comprised of methylene chloride; chloroform, carbon tetrachloride and the like, alcohols such as methanol, ethanol, isopropanol, butanol and the like, ketones such as acetone, methyl ethyl ketone, methyl isobutyl ketone and the like, tetrahydrofuran, N,N-dimethylformamide, and in an embodiment methylene chloride, by stirring said pigment in said solvent mixture for an effective period of time from about 30 seconds to about 24 hours and in an embodiment about 5 minutes at room temperature, about 25 degrees, in air or under an inert atmosphere such as argon or nitrogen; 2) reprecipitating said dissolved pigment by slowly pouring said dissolved solution at a rate of about 10 milliliters per minute to about 200 milliliters per minute and in an embodiment about 20 milliliters per minute to a nonsolvent comprised of alcohols such as methanol, ethanol, isopropanol, butanol and the like, ketones such as acetone, methyl ethyl ketone, isobutyl ketone and the like, water, N,N-dimethylformamide, tetrahydrofuran or mixtures thereof, and in an embodiment a mixture comprised of 1 volume part of methanol and 1 volume part of water, which solvent mixture was maintained at room temperature, about 25 degrees, while being stirred at a rate sufficient to create a vortex extending to the bottom of the flask containing said solvent mixture; 3) filtering the dark blue suspension through a glass fiber filter fitted in a porcelain funnel; 4) washing the isolated solid by redispersing in an organic solvent such as methanol or acetone or the like by stirring for an effective period of time of from about 1 minute to about 24 hours and in this embodiment about 1 hour in an amount of from about 10 volume parts to about 100 volume parts and in an embodiment about 50 volume parts of solvent, like methanol, for each weight part of solid Type I pigment that was dissolved, followed by filtration as described before; 5) further washing by redispersing in deionized water which was heated to a temperature of from about 75 degrees to about 100 degrees and in an embodiment about 95 degrees in an amount of from about 10 volume parts to about 100 volume parts and in an embodiment about 50 volume parts relative to the original weight of solid Type I pigment used, followed by filtration as illustrated herein; 6) repeating step 5 exactly as described; 7) drying the resulting blue pigment in air or in the presence of a vacuum at a temperature of from about 25 degrees to about 200 degrees and in an embodiment in air at about 70 degrees for a period of from about 5 minutes to about 48 hours and in an embodiment about 1 hours to afford a dark blue powder in a desirable yield of from about 75 percent to about 99 percent and in this embodiment about 97 percent which has been identified as being Type X titanyl phthalocyanine on the basis of its XRPD spectrum. The aforementioned Type X titanyl phthalocyanine can be selected for use in a layered photogenerator device, or can be utilized as an intermediate for conversion to Type IV titanyl phthalocyanine.

Subsequently, the Type X titanyl phthalocyanine thus obtained can be treated with a halobenzene, preferably chlorobenzene, to provide Type IV titanyl phthalocyanine which when selected as a photogenerator layer in a layered imaging member comprised of an aluminum supporting substrate, and a top layer of an aryl amine as illustrated herein possesses excellent xerographic characteristics, such as for example: $E_{\frac{1}{2}}=0.9$ ergs/cm$^2$, dark decay=5 to 15 volts/second, and a discharge at 5 and 10 ergs/cm$^2$ of 87 and 90 percent, respectively.

In an embodiment, the Type X (titanyl phthalocyanine) pigment can be redispersed as follows: 1) dispersing the wet filter cake, obtained in step 6) of the aforementioned previous embodiment, said cake containing 1 weight part of solid Type X therein in an organic solvent, for example chlorobenzene, methylene chloride, tetrahydrofuran, bromobenzene, dichlorobenzenes, trichlorobenzenes, trichloroethanes and the like, and in a preferred embodiment chlorobenzene in an amount of from about 10 volume parts to about 200 volume parts and in an embodiment of about 50 volume parts by stirring rapidly at a rate of from about 100 RPM to about 500 RPM and in an embodiment about 250 RPM at a temperature of from about 0 degrees to about 100 degrees and in an embodiment at room temperature, about 25 degrees, for an effective period of time, from about 5 minutes to about 6 hours and in this embodiment about 1 hour; 2) separating the solid pigment from the solvent by, for example, vacuum filtration through a porcelain funnel fitted with a glass fiber filter; and 3) drying the resulting pigment in air or under vacuum at a temperature of from about 50 degrees to about 200 degrees and in an embodiment in air at about 70 degrees. The Type IV titanyl phthalocyanine thus obtained, identified on the basis of its XRPD trace, was found to have excellent xerographic characteristics: $E_{\frac{1}{2}}=0.9$ ergs/cm$^2$, dark decay=10 to 15 volts/second, and a discharge at 5 and 10 ergs/cm$^2$ of 86 and 89 percent, respectively, when the so obtained Type IV was selected as a photogenerator in a layered imaging member, such as that of Example II.

When utilizing Type X as an intermediate to achieve Type IV, a number of advantages can be provided, such an increased photosensitivity for a layered imaging member comprised of the aforementioned phthalocyanine as a photogenerator layer situated between a supporting substrate and an aryl amine charge transport layer as compared to, for example, obtaining Type IV from Type I directly. Furthermore, the treatment of the Type X intermediate with chlorobenzene can provide Type IV titanyl phthalocyanines having higher xerographic photosensitivity than when a Type IV intermediate is treated in a similar manner.

For example, a Type IV pigment prepared by dissolution of a Type I pigment as illustrated hereinbefore, followed by reprecipitation in a mixture of 1:1 methanol/water afforded Type X titanyl phthalocyanine as determined by an X-ray powder diffraction trace. Treatment of the Type X intermediate with chlorobenzene as illustrated herein provided Type IV titanyl phthalocyanine having an $E_{\frac{1}{2}}=0.8$ ergs/cm$^2$, a dark decay=5 to 15 volts/second, and a discharge at 5 and 10 ergs/cm$^2$ of 87 and 90 percent, respectively, when the obtained Type IV was selected as a photogenerator in a layered imaging member comprised of the aforementioned phthalocyanine as a photogenerator layer, situated between a supporting substrate and an aryl amine charge transport layer, as illustrated herein, reference the Figures and Example II specifically, for example.

When the dissolved pigment was reprecipitated in a mixture of 25/75 methanol/water, the product was Type IV titanyl phthalocyanine as determined by an X-ray powder diffraction trace. Treatment of the Type IV intermediate with chlorobenzene as illustrated herein afforded Type IV titanyl phthalocyanine having the following electrical characteristics: $E_{\frac{1}{2}}=1.3$ ergs/cm$^2$, dark decay=31 volts/second, and a discharge at 5 and 10 ergs/cm$^2$ of 81 and 87 percent, respectively, when Type IV was selected as a photogenerator in the layered imaging member of Example II. With regard to the imaging member electrical characteristics illustrated herein, there was selected the member of Example II, unless otherwise indicated.

As the solvent mixture for dissolving the Type I titanyl phthalocyanine, there can be selected a strong organic acid, such as a trihaloacetic acid, including trifluoroacetic acid or trichloroacetic acid, and a cosolvent, such as an alkylene halide, such as methylene chloride, chloroform, trichloroethylene, bromoform and other short chain halogenated alkanes and alkenes with from 1 to about 6 carbon atoms and from 1 to about 6 halogen atoms including chlorofluorocarbons and hydrochlorofluorocarbons; haloaromatic compounds such as chlorobenzene, dichlorobenzene, chloronaphthalene, fluorobenzene, bromobenzene, and benzene; alkylbenzenes such as toluene and xylene; and other organic solvents which are miscible with strong organic acids and which will effectively dissolve the titanyl phthalocyanine, in effective amounts of, for example, a ratio of from about 1 to 50 parts of acid to about 50 parts of cosolvent such as methylene chloride. In an embodiment of the present invention, a preferred solvent mixture is comprised of trifluoroacetic acid and methylene chloride in a ratio of from about 5 parts of acid to about 95 parts of methylene chloride to 25 parts of acid to 75 parts of methylene chloride.

Subsequent to solubilization with the above solvent mixture and stirring for an effective period of time of, for example, from about 5 minutes to about two weeks, the resulting mixture is added to a solvent mixture that will enable precipitation of the desired titanyl phthalocyanine polymorph, such as Type X, which solvent mixture is comprised of an alcohol such as an alkylalcohol containing from 1 to about 10 carbon atoms, such as methanol, ethanol, propanol, isopropanol, butanol, n-butanol, pentanol and the like, alone or with water, in a ratio of from about 99 percent solvent to about 1 percent water to about 1 percent solvent to about 99 percent water; and reprecipitating the morphology, the titanyl phthalocyanine product being dependent, for example, on the choice of solvent and precipitant solvent. The solid Type X pigment resulting can then be dried by, for example, oven heating in air or under vacuum at a temperature of from about 50 degrees to about 200 degrees and preferably about 70 degrees for a period of from 5 minutes to several days yielding a dark blue pigment of the desired titanyl phthalocyanine polymorph, such as Type X or Type IV, depending on the choice of solvent and/or precipitant solvent. The Type X or Type IV pigment obtained can then be further treated to provide a very highly photosensitive form of Type IV titanyl phthalocyanine by the treatment of said Type X or Type IV with chlorobenzene as illustrated herein. The Type IV products typically have $E_{\frac{1}{2}}=0.8$ to 1.0 ergs/cm$^2$, dark decay=5 to 20 volts/second, and a discharge at 5 and 10 ergs/cm$^2$ of 86 to 88 and 88 to 91 percent, respectively, when the so obtained Type IV is selected as a photogenerator in the layered imaging member of Example II.

In an embodiment of the present invention, there is provided a process for the preparation of titanyl phthalocyanine polymorphs, which comprises: 1) dissolving titanyl phthalocyanine Type I in a mixture of trifluoroacetic acid and methylene chloride comprised of from 5 percent acid to about 25 percent acid and 95 parts to 75 parts of methylene chloride, wherein the amount of Type I pigment selected was 1 weight part to 10 volume parts of acid solution, by adding the pigment to the solution and stirring the mixture for an effective period of time, for example from about 5 minutes to several days, and in an embodiment about two weeks, at a temperature of from about 0° to about 50° C.; 2) pouring or adding the resultant solution into a rapidly stirred precipitant solvent (alcohol, such as methanol and water as illustrated herein) in a ratio of from about 1 part of the aforementioned pigment solution to 2 parts of precipitant solution to about 1 part of pigment solution to about 50 parts of precipitant at a temperature of from about 0° to about 100° C. over a period of from 1 minute to about 60 minutes to ensure rapid efficient mixing in an embodiment, wherein the precipitant solution was stirred at a rate sufficient to form a deep vortex in the reaction vessel, and followed by pouring the TiOPc pigment in a slow stream into the side of the vortex; 3) following the step 2) addition, the resultant dispersion of the desired polymorphic form of TiOPc was stirred at a temperature of from 0° to about 100° C. for a period of from about 5 minutes to about 24 hours; 4) subsequently separating the titanyl phthalocyanine from the mother liquor by filtration, for example through a glass fiber filter in a porcelain filter funnel, and washing the product titanyl phthalocyanine Type I pigment in the funnel with an effective amount of a material like dimethylformamide to remove most of the acidic mother liquor; 5) redispersing the resulting wet cake in a solvent mixture of methanol and water, and the like in an effective amount of, for example, from about 20 parts to about 100 parts of solvent to 1 part of the pigment for a period of from about 5 minutes to 24 hours at a temperature of from 0° C. to about 100° C., the primary purpose of such a step being to further remove any residual acid or other impurities from the particular polymorphic form of TiOPc which resulted from the precipitation process; 6) isolating the desired titanyl phthalocyanine polymorph X by, for example, filtration through a glass fiber filter as in step 4), and subsequently optionally washing the solid product in the funnel with a solvent, such as water, methanol or acetone, and the like to complete purification. The product can be obtained after the solid has been dried at a temperature of from about 25° to about 150° C. for a time of 1 hour to about 24 hours, for example either in the air or under vacuum. A yield corresponding to about 95 percent to about 75 percent of the weight of the starting pigment can be obtained. The polymorphic form Type X of the final pigment was determined by XRPD analysis.

The Type X titanyl phthalocyanine pigments can be used as photogenerator materials for incorporation into a layered imaging member, or alternatively can be used as intermediates to be treated with organic solvents, for example chlorobenzene, methylene chloride, tetrahydrofuran and the like, to afford with chlorobenzene titanyl phthalocyanine Type IV pigments having excellent xerographic characteristics, for example $E_{\frac{1}{2}} = 0.8$ to 1.0 ergs/cm$^2$, dark decay=5 to 20 volts/second, and a discharge at 5 and 10 ergs/cm$^2$ of 86 to 88 and 88 to 91 percent, respectively, when the obtained Type IV is selected as a photogenerator in the layered imaging member of Example II.

In another embodiment of the present invention, solutions of TiOPc in a 1:4 mixture of trifluoroacetic acid and methylene chloride were precipitated into varying mixtures of methanol and water ranging from 100 percent of methanol to 100 percent of water. Following the above described isolation, the samples were analyzed by XRPD, and the results are provided in Table 3 that follows.

TABLE 3

| Precipitant Solvent Ratio MeOH/H$_2$O | XRPD Analysis |
|---|---|
| 100:0 | Type Z-1 |
| 95:5 | Type III (major) |
| 90:10 | Type III (major) |
| 85:15 | Type III (major) |
| 80:20 | Type III (major) |
| 75:25 | Type III (major) |
| 70:30 | Type III (major) |
| 65:35 | Type III (minor) + Type X |
| 60:40 | Type X |
| 55:45 | Type X |
| 50:50 | Type X |
| 45:55 | Type X |
| 40:60 | Type X |
| 35:65 | Type X |
| 30:70 | Type IV |
| 25:75 | Type IV |
| 20:80 | Type IV |
| 0:100 | Type IV |

The data in this Table illustrate that at relatively high methanol concentrations the preponderant polymorph formed is the Type III form. However, beginning at a composition of about 65 percent of methanol and 35 percent of water the Type X form predominates. Polymorphically pure Type X is obtained when the acid solution is precipitated into methanol/water compositions ranging from 60 to 35 percent of methanol. Compositions containing less than about 35 percent of methanol and pure water result in the formation of the Type IV form which has the XRPD peaks at 2 theta=9.8 degrees.

In specific embodiments of the present invention, the following can be accomplished:

Five grams of Type I TiOPc can be dissolved in 100 milliliters of a 1:4 mixture (v/v) of trifluoroactic acid (TFA) and methylene chloride (CH$_2$Cl$_2$) to provide a dark green solution containing no undissolved TiOPc. The resulting solution was then divided into 5×20 milliliter portions.

A 20 milliliter portion of the above prepared solution was poured over about a 2 minute period into 100 milliliters of a well stirred solution of methanol in water (1:1,v/v). The resultant dark blue precipitate was vacuum filtered through a 4.25 centimeter glass fiber paper in a Büchner funnel. The solid was washed on the funnel with:

a) 20 milliliters of 1:1 (v/v) water/methanol
b) 3×10 milliliter portions of methanol
c) 3×5 milliliter portions of deionized water
d) 2×5 milliliter portions of methanol The resulting solid was dried at 70° C. for 16 hours to yield 0.95 gram of dark blue pigment. An XRPD analysis of this material showed that it was the Type X polymorphic form of TiOPc.

A second portion, 20 milliliter aliquot, of the above prepared TFA/CH$_2$Cl$_2$ solution was poured into 100 milliliters of isopropyl alcohol. The resulting precipitated blue powder was isolated and dried as indicated herein except that the first washing used 20 milliliters of isopropanol. The product, 0.93 gram of blue powder, was identified as Type II TiOPc by XRPD.

A third portion, 20 milliliter aliquot, of the above prepared solution was poured into 100 milliliters of diethyl ether and the precipitated product was isolated as indicated herein except that the first wash used 20 milliliters of diethyl ether. The resultant 0.82 gram of blue powder was identified as Type I TiOPc by XRPD.

A fourth portion, 20 milliliters aliquot, of the above prepared TFA/CH$_2$Cl$_2$ solution was added to 100 milliliters of chlorobenzene. A dark green solution was obtained. This was treated with 20 milliliters of water with vigorous stirring and the resultant suspension was further processed as indicated herein except that the initial washing step, a), was omitted to yield 0.93 gram of blue pigment which was shown to be Type IV TiOPc by XRPD.

A fifth portion, 20 milliliters, of the above TFA/CH$_2$Cl$_2$ solution was poured over a 1 minute period into a vigorously stirred suspension of toluene in water (1:1, v/v). The precipitated solid was isolated exactly as indicated herein. The product was 0.93 gram of blue solid which was identified as Type IV TiOPc by XRPD.

Numerous different layered photoresponsive imaging members with the phthalocyanine pigments, such as Type IV, obtained by the processes of the present invention can be fabricated. In one embodiment, thus the layered photoresponsive imaging members are comprised of a supporting substrate, a charge transpoprt layer, especially an aryl amine hole transport layer, and situated therebetween a photogenerator layer comprised of titantyl phthalocyanine of Type IV, Type I or Type X, with Type IV being preferred. Another embodiment of the present invention is directed to positively charged layered photoresponsive imaging members comprised of a supporting substrate, a charge transport layer, especially an aryl amine hole transport layer, and as a top overcoating titanyl phthalocyanine pigment Type IV obtained with the processes of the present invention. Moreover, there is provided in accordance with the present invention an improved negatively charged photoresponsive imaging member comprised of a supporting substrate, a thin adhesive layer, a titanyl phthalocyanine Type IV, obtained by the processes of the present invention, photogenerator dispersed in a polymeric resinous binder, and as a top layer aryl amine hole transporting molecules dispersed in a polymeric resinous binder.

The photoresponsive imaging members of the present invention can be prepared by a number of known methods, the process parameters and the order of coating of the layers being dependent on the member desired. The imaging members suitable for positive charging can be prepared by reversing the order of deposition of photogenerator and hole transport layers. The photogenerating and charge transport layers of the imaging members can be coated as solutions or dispersions onto selective substrates by the use of a spray coater, dip coater, extrusion coater, roller coater, wire-bar coater, slot coater, doctor blade coater, gravure coater, and the like, and dried at from 40° to about 200° C. for from 10 minutes to several hours under stationary conditions or in an air flow. The coating is carried out in such a manner that the final coating thickness is from 0.01 to about 30 microns after it has dried. The fabrication conditions for a given layer will be tailored to achieve optimum performance and cost in the final device.

Imaging members with the titanyl phthalocyanine pigments of the present invention, especially Type IV, are useful in various electrostatographic imaging and printing systems, particularly those conventionally known as xerographic processes. Specifically, the imaging members of the present invention are useful in xerographic imaging processes wherein the titanyl phthalocyanine pigments absorb light of a wavelength of from about 600 nanometers to about 900 nanometers. In these known processes, electrostatic latent images are initially formed on the imaging member followed by development, and thereafter transferring the image to a suitable substrate.

Moreover, the imaging members of the present invention can be selected for electronic printing processes with gallium arsenide light emitting diode (LED) arrays which typically function at wavelengths of from 660 to about 830 nanometers.

BRIEF DESCRIPTION OF THE DRAWINGS

For a better understanding of the present invention and further features thereof, reference is made to the following detailed description of various preferred embodiments wherein:

FIGS. 1A, 1B, 1C, 1D and 1E are diffractograph summaries of the XRPDs of the known polymorphs, Type I, II, III, IV and X of titanyl phthalocyanine;

The X-ray powder diffraction traces (XRPDs) obtained from these 5 forms which are shown in FIGS. 1A, 1B, 1C, 1D and 1E were generated on a Philips X-Ray Powder Diffractometer Model 1710 using X-radiation of CuKα wavelength ($\Lambda = 0.1542$ nanometer). The diffractometer was equipped with a graphite monochrometer and pulseheight discrimination system. Two-theta is the Bragg angle commonly referred to in x-ray crystallographic measurements. I (counts) represents the intensity of the diffraction as a function of Bragg angle as measured with a proportional counter. Subclasses of these forms with broad, more poorly resolved peaks than those shown in FIGS. 1A, 1B, 1C, 1D and 1E can be envisioned, however, the basic features of the diffractograms indicate the major peaks in the same position although the smaller peaks can be unresolved. This broadening of XRPD peaks is generally found in pigments having a very small particle size.

DESCRIPTION OF THE PREFERRED EMBODIMENTS

Figure 1B:
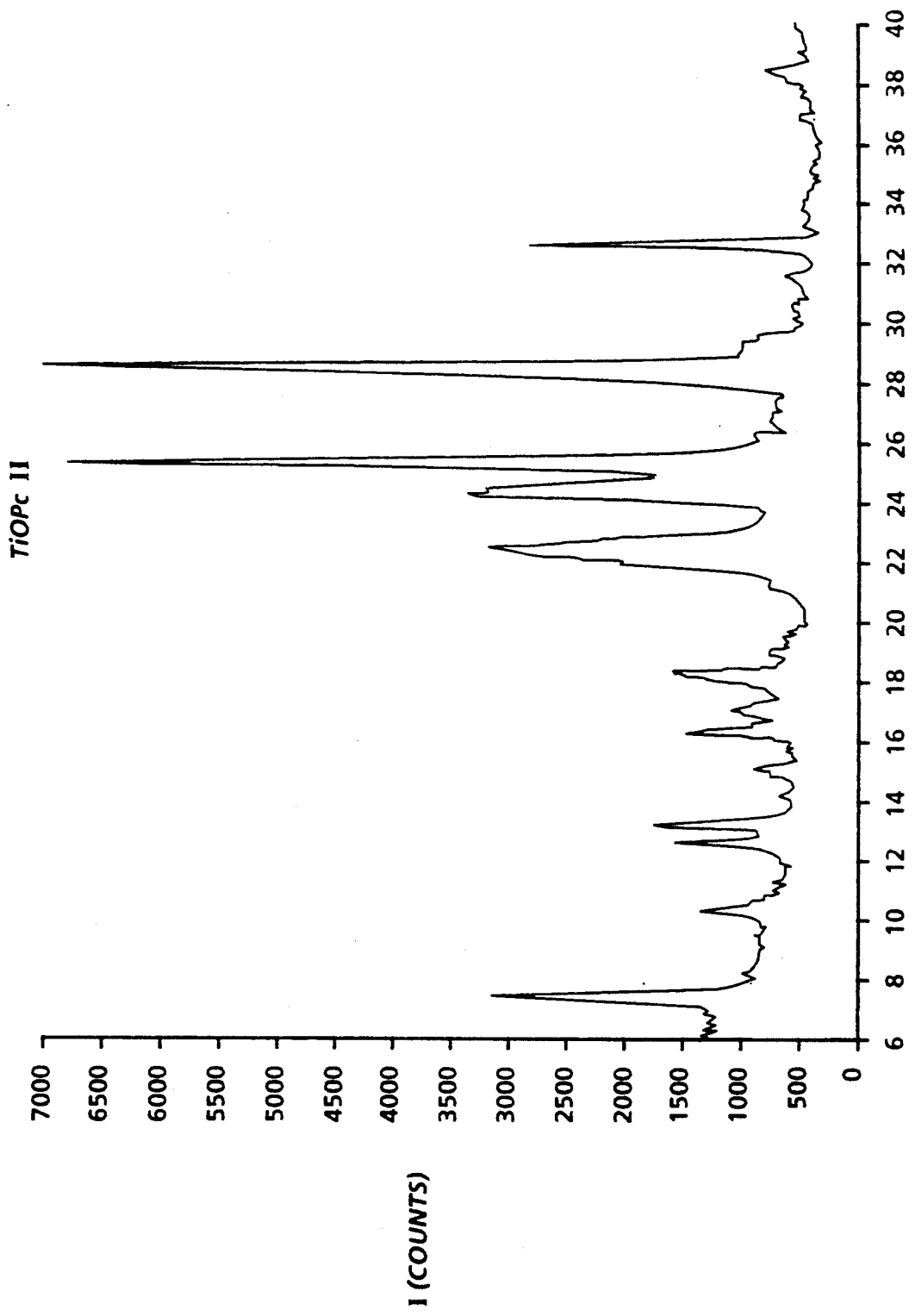
Figure 1C:
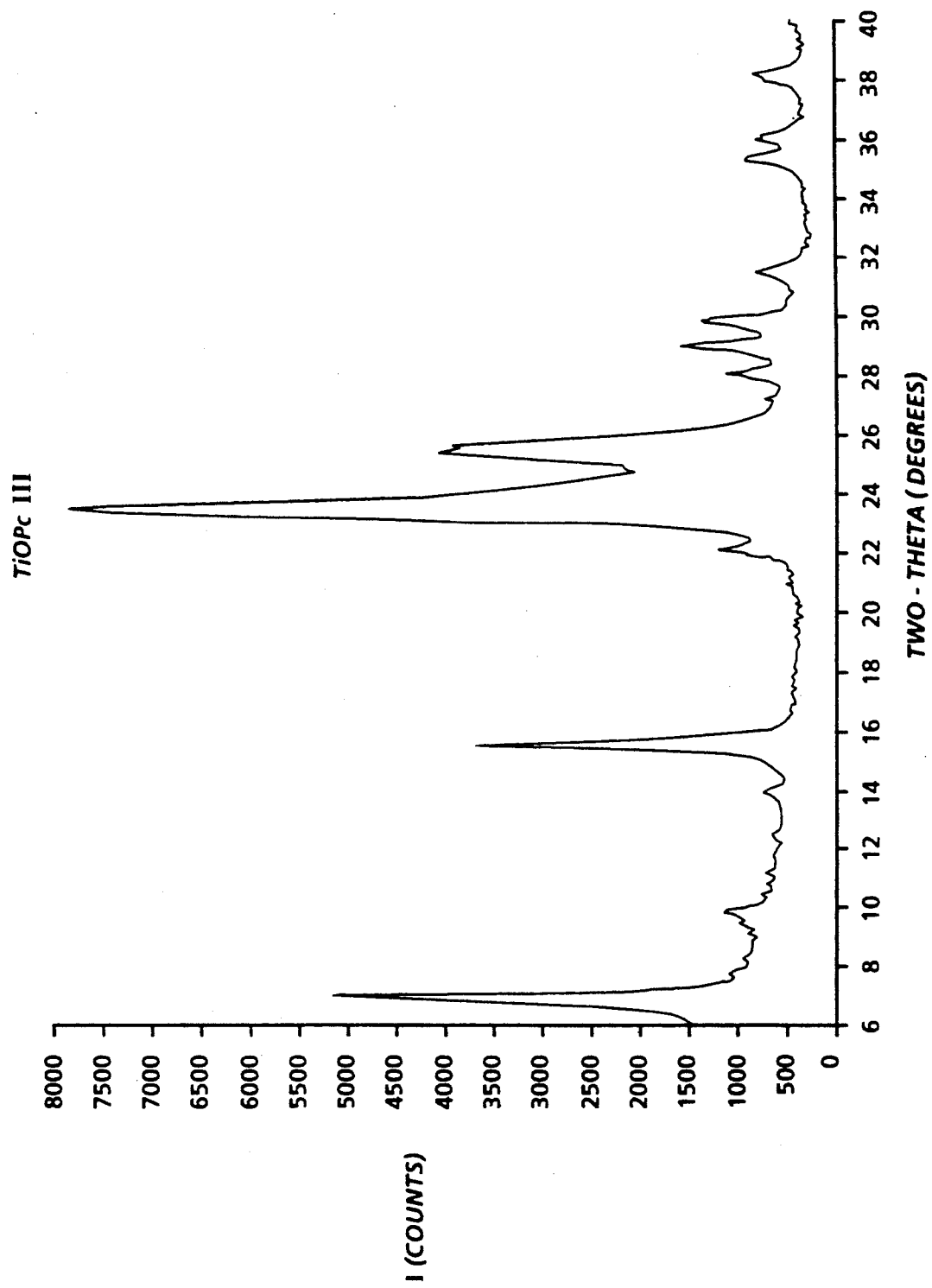
Figure 1D:
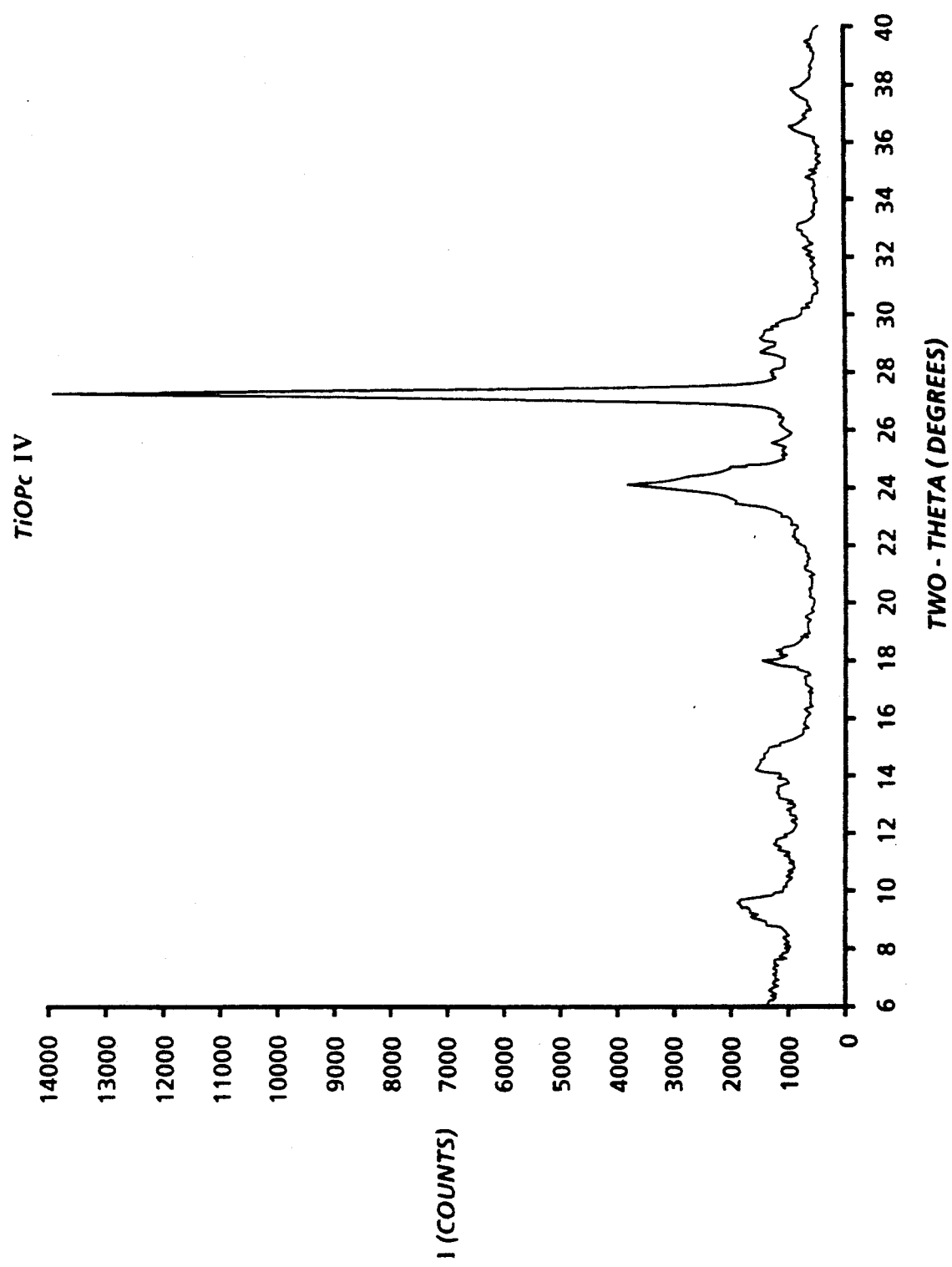
Figure 1E:
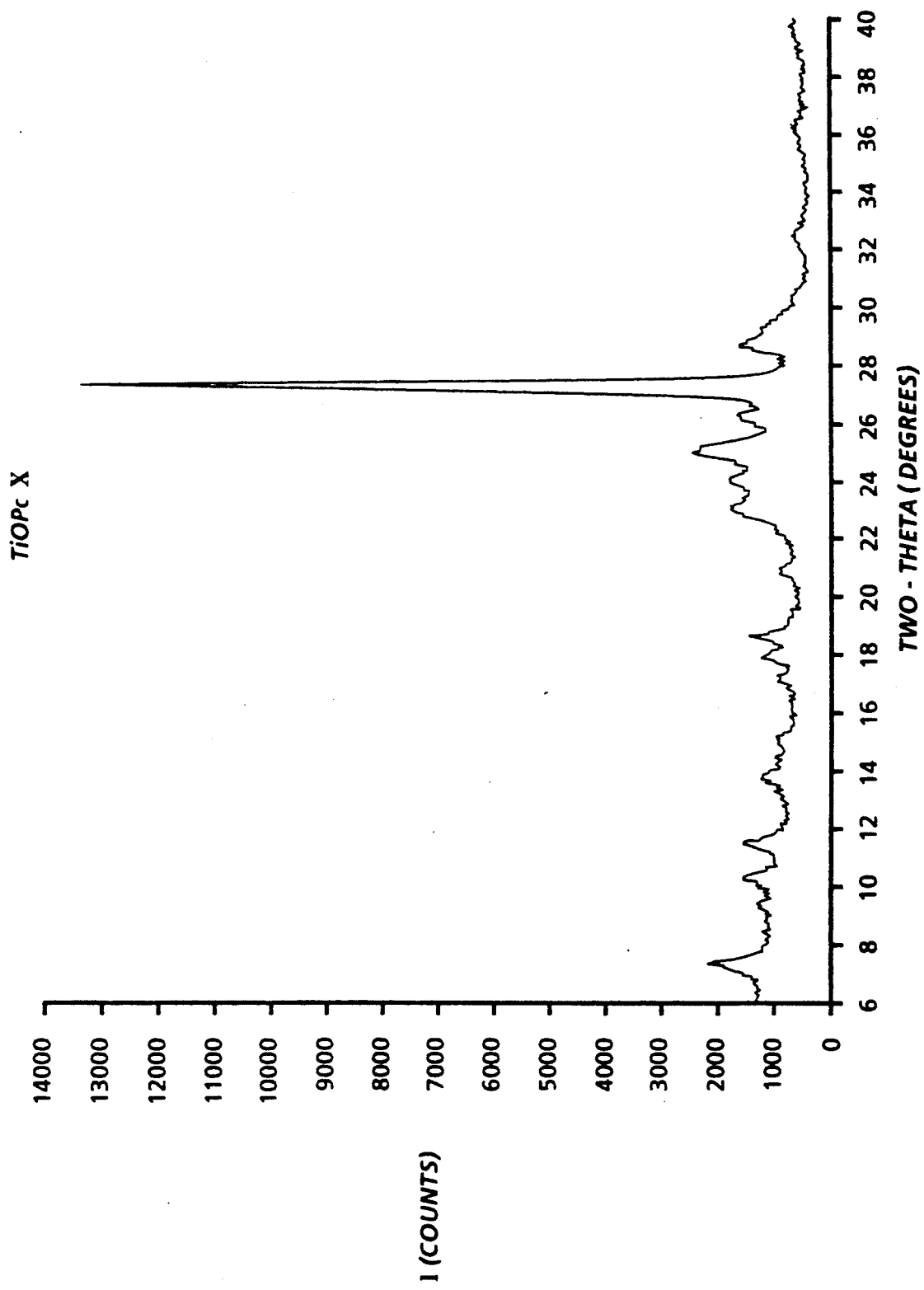
Figure 2:
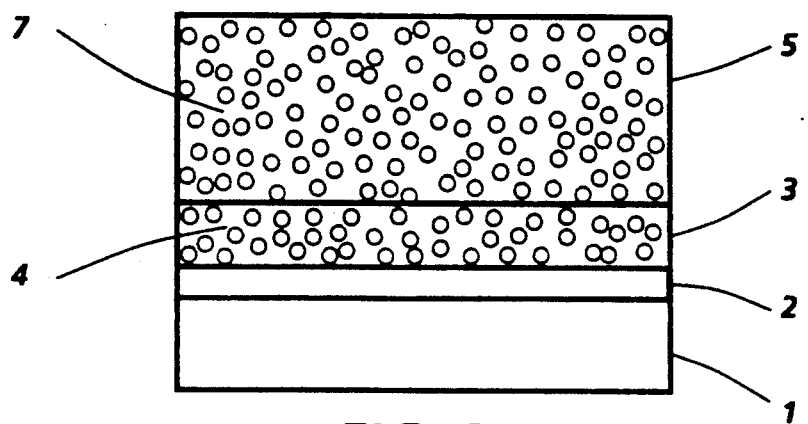
FIG. 2 is a partially schematic cross-sectional view of a negatively charged photoresponsive imaging member of the present invention.

Illustrated in FIG. 2 is a negatively charged photoresponsive imaging member of the present invention comprised of a supporting substrate 1, a solution coated adhesive layer 2 comprised, for example, of a polyester 49,000 available from Goodyear Chemical, a photogenerator layer 3 comprised of titanyl phthalocyanine, Type IV obtained with the process of the present invention optionally dispersed in an inactive resinous binder 4, and a hole transport layer 5, comprised of N,N'-diphenyl-N,N'-bis(3-methyl phenyl)-1,1'-biphenyl-4,4'-diamine dispersed in a polycarbonate resinous binder 7.

Figure 3:
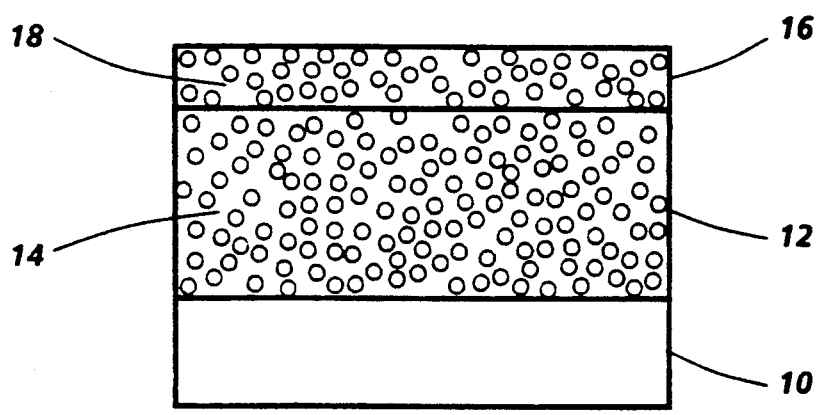
FIG. 3 is a partially schematic cross-sectional view of a positively charged photoresponsive imaging member of the present invention.

Illustrated in FIG. 3 is a positively charged photoresponsive imaging member of the present invention comprised of a substrate 10, a charge transport layer 12 comprised of N,N'-diphenyl-N,N'-bis(3-methyl phenyl)-1,1'-biphenyl-4,4'-diamine dispersed in a polycarbonate resinous binder 14, and a titanyl phthalocyanine Type IV photogenerator layer 16 obtained with the process of the present invention optionally dispersed in an inactive resinous binder 18.

Substrate layers selected for the imaging members of the present invention can be opaque or substantially transparent, and may comprise any suitable material having the requisite mechanical properties. Thus, the substrate may comprise a layer of insulating material including inorganic or organic polymeric materials, such as MYLAR ® a commercially available polymer, MYLAR ® containing titanium, a layer of an organic or inorganic material having a semiconductive surface layer, such as indium tin oxide or aluminum arranged thereon, or a conductive material inclusive of aluminum, chromium, nickel, brass or the like. The substrate may be flexible, seamless, or rigid and many have a number of many different configurations, such as for example a plate, a cylindrical drum, a scroll, an endless flexible belt and the like. In one embodiment, the substrate is in the form of a seamless flexible belt. In some situations, it may be desirable to coat on the back of the substrate, particularly when the substrate is a flexible organic polymeric material, an anticurl layer, such as for example polycarbonate materials commercially available as MAKROLON ®.

The thickness of the substrate layer depends on many factors, including economical considerations, thus this layer may be of substantial thickness, for example over 3,000 microns, or of minimum thickness. In one embodiment, the thickness of this layer is from about 75 microns to about 300 microns.

With further regard to the imaging members, the photogenerator layer is preferably comprised of the titanyl phthalocyanine pigments obtained with the processes of the present invention dispersed in resinous binders. Generally, the thickness of the photogenerator layer depends on a number of factors, including the thicknesses of the other layers and the amount of photogenerator material contained in this layer. Accordingly, this layer can be of a thickness of from about 0.05 micron to about 10 microns when the titanyl phthalocyanine photogenerator composition is present in an amount of from about 5 percent to about 100 percent by volume. In one embodiment, this layer is of a thickness of from about 0.25 micron to about 1 micron, when the photogenerator composition is present in this layer in an amount of 30 to 75 percent by volume. The maximum thickness of this layer in an embodiment is dependent primarily upon factors, such as photosensitivity, electrical properties and mechanical considerations. The charge generator layer can be obtained by dispersion coating the TiOPc obtained with the processes of the present invention, and a binder resin with a suitable solvent. The binder may be omitted. The dispersion can be prepared by mixing and/or milling the TiOPc in equipment such as paint shakers, ball mills, sand mills and attritors. Common grinding media such as glass beads, steel balls or ceramic beads may be used in this equipment. The binder resin may be selected from a wide number of polymers such as poly(vinyl butyral), poly(vinyl carbazole), polyesters, polycarbonates, poly(vinyl chloride), polyacrylates and methacrylates, copolymers of vinyl chloride and vinyl acetate, phenoxy resins, polyurethanes, poly(vinyl alcohol), polyacrylonitrile, polystyrene, and the like. The solvents to dissolve these binders depend upon the particular resin. In embodiments of the present invention, it is desirable to select solvents that do not effect the other coated layers of the device. Examples of solvents useful for coating TiOPc dispersions to form a photogenerator layer are ketones, alcohols, aromatic hydrocarbons, halogenated aliphatic hydrocarbons, ethers, amines, amides, esters, and the like. Specific examples are cyclohexanone, acetone, methyl ethyl ketone, methanol, ethanol, butanol, amyl alcohol, toluene, xylene, chlorobenzene, carbon tetrachloride, chloroform, methylene chloride, trichloroethylene, tetrahydrofuran, dioxane, diethyl ether, dimethylformamide, dimethylacetamide, butyl acetate, ethyl acetate, methoxyethyl acetate, and the like.

The coating of the TiOPc dispersion in embodiments of the present invention can be accomplished with spray, dip, wire-bar methods or other known processes, such that the final dry thickness of the charge generator layer is from 0.01 to 30 microns, and preferably from 0.1 to 15 microns after being dried at 40° to 150° C. for 5 to 90 minutes.

Illustrative examples of polymeric binder resinous materials that can be selected for the photogenerator pigment include those polymers as disclosed in U.S. Pat. No. 3,121,006, the disclosure of which is totally incorporated herein by reference.

As adhesives, usually situated in contact with the supporting substrate there can be selected various known substances inclusive of polyesters, polyamides, poly(vinyl butyral), poly(vinyl alcohol), polyurethane and polyacrylonitrile. This layer is of a thickness of from about 0.05 micron to 1 micron. Optionally, this layer may contain conductive and nonconductive particles, such as zinc oxide, titanium dioxide, silicon nitride, carbon black, and the like, to provide, for example, in embodiments of the present invention desirable electrical and optical properties.

Aryl amines selected for the charge transporting layer which generally is of a thickness of from about 5 microns to about 75 microns, and preferably of a thickness of from about 10 microns to about 40 microns, include molecules of the following formula:

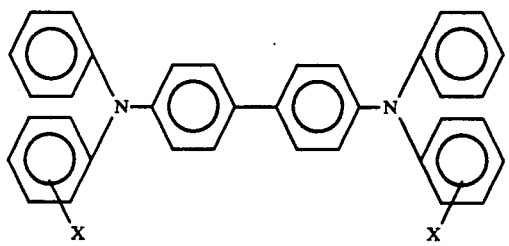

dispersed in a highly insulating and transparent organic resinous binder wherein X is an alkyl group or a halogen, especially those substituents selected from the group consisting of (ortho) $CH_3$, (para) $CH_3$, (ortho) Cl, (meta) Cl, and (para) Cl.

Examples of specific aryl amines are N,N'-diphenyl-N,N'-bis(alkylphenyl)-1,1-biphenyl-4,4'-diamine wherein alkyl is selected from the group consisting of methyl, such as 2-methyl, 3-methyl and 4-methyl, ethyl, propyl, butyl, hexyl, and the like. With chloro substitution, the amine is N,N'-diphenyl-N,N'-bis(halo phenyl)-1,1'-biphenyl-4,4'-diamine wherein halo is 2-chloro, 3-chloro or 4-chloro. Other known charge transporting compounds can be selected, reference for example U.S. Pat. Nos. 4,921,773 and 4,464,750, the disclosures of which are totally incorporated herein by reference.

Examples of the highly insulating and transparent resinous material or inactive binder resinous material for the transport layers include materials such as those described in U.S. Pat. 3,121,006, the disclosure of which is totally incorporated herein by reference. Specific examples of organic resinous materials include polycarbonates, acrylate polymers, vinyl polymers, cellulose polymers, polyesters, polysiloxanes, polyamides, polyurethanes and epoxies as well as block, random or alternating copolymers thereof. Preferred electrically inactive binders are comprised of polycarbonate resins having a molecular weight of from about 20,000 to about 100,000 with a molecular weight of from about 50,000 to about 100,000 being particularly preferred. Generally, the resinous binder contains from about 10 to about 75 percent by weight of the active material corresponding to the foregoing formula, and preferably from about 35 percent to about 50 percent of this material.

Also included within the scope of the present invention are methods of imaging and printing with the photoresponsive devices illustrated herein. These methods generally involve the formation of an electrostatic latent image on the imaging member, followed by developing the image with a toner composition, reference U.S. Pat. Nos. 4,560,635; 4,298,697 and 4,338,390, the disclosures of which are totally incorporated herein by reference, subsequently transfering the image to a suitable substrate, and permanently affixing the image thereto. In those environments wherein the device is to be used in a printing mode, the imaging method involves the same steps with the exception that the exposure step can be accomplished with a laser device or image bar.

Embodiments of the present invention include a process for the preparation of titanyl phthalocyanine, which comprises dissolving Type I titanyl phthalocyanine in a mixture of trihaloacetic acid and an alkylene halide, and preferably trifluoroacetic acid and methylene chloride in a ratio of from about one volume part of acid to about 1 volume part of halide to about one volume part of acid to about 10 volume parts of halide and preferably about one volume part of acid to about 4 volume parts of halide; adding the aforementioned dissolved solution to a solution containing an alcohol, said solution preferably comprised of from about 1 percent of methanol to about 99 percent of water to about 99 percent of methanol to about 1 percent of water, and preferably about 50 percent of methanol and 50 percent of water; isolating Type X titanyl phthalocyanine from said alcohol solution; subsequently washing the Type X obtained with alcohol, and then hot water; thereafter dispersing the Type X in a halobenzene, and in an embodiment chlorobenzene; and isolating Type IV titanyl phthalocyanine; a process for the preparation of titanyl phthalocyanine which comprises dissolving Type I titanyl phthalocyanine in a mixture of trihaloacetic acid and an alkylene halide, and preferably trifluoroacetic acid and methylene chloride in a ratio of from about one volume part of acid to about 1 volume part of halide to about one volume part of acid to about 10 volume parts of halide and preferably about one volume part of acid to about 4 volume parts of halide; adding the aforementioned dissolved solution to a solution containing an alcohol, said solution preferably comprised of from about 1 percent methanol to about 99 percent of water to about 99 percent of methanol to about 1 percent of water, and preferably about 25 percent of methanol and 75 percent of water; isolating Type IV titanyl phthalocyanine from said alcohol solution; subsequently washing the Type IV obtained with alcohol, and then hot water; thereafter dispersing the Type IV in a halobenzene, and in an embodiment chlorobenzene; and isolating Type IV titanyl phthalocyanine; and a process for the preparation of titanyl phthalocyanine which comprises dissolving Type I titanyl phthalocyanine in a mixture of trihaloacetic acid and an alkylene halide, and preferably trifluoroacetic acid and methylene chloride in a ratio of from about one volume part of acid to about 1 volume part of halide to about one volume part of acid to about 10 volume parts of halide, and preferably about one volume part of acid to about 4 volume parts of halide; adding the aforementioned dissolved solution to a solution containing an alcohol, said solution preferably comprised of from about 1 percent of methanol to about 99 percent of water to about 99 percent of methanol to about 1 percent of water, and preferably about 85 percent of methanol and 15 percent of water; isolating Type III titanyl phthalocyanine from said alcohol solution; subsequently washing the Type III obtained with alcohol, and then hot water; thereafter dispersing the Type III in a halobenzene, and in an embodiment chlorobenzene; and isolating Type IV titanyl phthalocyanine.

The following Examples are provided.

EXAMPLE I

Synthesis of Type I Titanyl Phthalocyanine:

To a 300 milliliter three-necked flask fitted with mechanical stirrer, condenser and thermometer maintained under an argon atmosphere were added 3.6 grams (0.025 mole) of 1,3-diiminoisoindolene, 9.6 grams (0.075 mole) of o-phthalonitrile, 75 milliliters (80 weight percent) of N-methyl pyrrolidone and 7.11 grams (0.025 mole) of titanium tetrapropoxide (all the aforementioned reagents were obtained from Aldrich Chemical Company except the phthalonitrile which was obtained from BASF). The resulting mixture (20 weight percent of solids) was stirred and warmed to reflux (about 198° C.) for 2 hours. The resultant black suspension was cooled to about 160° C. then was filtered by suction through a 350 milliliter, M-porosity sintered glass funnel which had been preheated with boiling, 150° C., dimethyl formamide (DMF). The solid TiOPc I product resulting was washed with two 150 milliliter portions of boiling DMF and the filtrate, initially black, became a light blue-green color. The solid was slurried in the funnel with 150 milliliters of boiling DMF and the suspension was filtered. The resulting solid was washed in the funnel with 150 milliliters of DMF at 25° C. then with 50 milliliters of methanol. The resultant shiny dark blue solid was dried at 70° C. overnight to yield 10.9 grams (76 percent) of pigment which was identified as Type I TiOPc on the basis of its X-ray powder diffraction trace. All X-ray powder diffraction traces were obtained using a Phillips Model 1710 X-ray Powder Diffractometer equipped with a graphite monochrometer and pulse height analyzer. X-radiation of the CuK$\alpha$ wavelength ($\Lambda$=0.1542 nanometer) was used and all samples were finely ground with a mortar and pestle before loading into a standard powder diffraction holder. Elemental analysis of the product indicated C, 66.54; H, 2.60; N, 20.31; and Ash (TiO2), 13.76. TiOPc requires (Theory): C, 66.67; H, 2.80; N, 19.44; Ash, and 13.86.

This product had a crystal size or average diameter of about 50 microns as determined by SEM and a caliper with the crystal shape being tightly clustered aggregates of smaller crystallites. The washing and filtration steps were carried out rapidly with only about 5 minutes being selected to effect each DMF wash.

Particle sizes of titanyl phthalocyanine products obtained with the processes of the present invention in embodiments thereof can be from about 30 to about 100 microns in length, and from about 10 to about 50 microns in width as measured by SEM or TEM and a caliper.

EXAMPLE II

The titanyl phthalocyanines Type IV were evaluated as photogenerators in xerographic imaging devices which were prepared by the following procedure. An aluminized Mylar substrate (4 mil) was coated with a Nylon 8 solution, prepared by dissolving 5 grams of Nylon 8 (Dainippon Ink and Chemical Company) in 16 grams of n-butanol, 24 grams of methanol and 4 grams of water using a 1 mil gap applicator. This layer was dried at 135° C. for 20 minutes; the final thickness was measured to be 0.6 micron. A dispersion of the TiOPc was prepared by ball milling 0.35 gram of the TiOPc, Type IV, and poly(vinyl butyral) in 13.4 grams of butyl acetate in a 30 milliliter jar containing 70 grams of ⅛ inch stainless steel balls. The dispersion was milled for 20 hours then was coated onto the Nylon 8 layer described above using a 1 mil applicator. The thus formed photogenerating layer was dried at 100° C. for 10 minutes; its final thickness was determined to be about 0.40 micron.

Hole transporting layer solutions were prepared by dissolving 5.4 grams of N,N'-diphenyl-N,N-bis(3-methyl phenyl)-1,1'-biphenyl-4,4'-diamine, 8.1 grams of polycarbonate in 57.6 grams of chlorobenzene. The solution was coated onto the TiOPc generator layer using an 8 mil film applicator. The charge transporting layer thus obtained was dried at 115° C. for 60 minutes to provide a final thickness of about 23 microns.

The xerographic electrical properties of the photoresponsive imaging members were determined by electrostatically charging the surface thereof with a corona discharge source until the surface potential as measured by a capacitatively coupled probe attached to an electrometer attained an initial dark value, $V_O$, of −800 volts. After resting for 0.5 second in the dark, the charged member reached a surface potential, $V_{ddp}$, or dark development potential. The member was then exposed to filtered light from a Xenon lamp. A reduction in surface potential from $V_{ddp}$ to a background potential, $V_{bg}$, due to the photodischarge effect, was observed. The dark decay in volts per second was calculated as $(V_O-V_{ddp})/0.5$. The percent of photodischarge was calculated as $100 \times (V_{ddp}-V_{bg})/V_{ddp}$. The half-exposure energy, $E_{\frac{1}{2}}$, the required exposure energy causing reduction of the $V_{ddp}$ to half of its initial value, was determined. The wavelength of light selected was 800 nanometers.

EXAMPLE III

Synthesis of Type I Titanyl Phthalocyanine (D13/Bu/ClNp):

A 250 milliliter three-necked flask fitted with mechanical stirrer, condenser and thermometer maintained under an atmosphere of argon was charged with 1,3-diiminoisoindolene (14.5 grams—0.1 mole), titanium tetrabutoxide (8.5 grams—0.025 mole; Aldrich) and 75 milliliters of 1-chloronaphthalene. The mixture was stirred and warmed. At 140° C. the mixture turned dark green and began to reflux. At this time the vapor (this was identified as n-butanol by gas chromatography) was allowed to escape to the atmosphere until the reflux temperature reached 200° C. The reaction was maintained at this temperature for two hours then was cooled by removal of the heat source to 150° C. The product was filtered through a 150 milliliters M-porosity sintered glass funnel which was preheated to approximately 150° C. with boiling DMF, and then washed thoroughly with three portions of 100 milliliters of boiling DMF, followed by three portions of 100 milliliters DMF at room temperature, and then three portions of 50 milliliters of methanol, thus providing 10.3 grams (72 percent yield) of a shiny purple pigment which was identified as Type I TiOPc by XRPD.

EXAMPLE IV

Synthesis of Type I Titanyl Phthalocyanine (D13/Pn/Pr/NMP):

To a 300 milliliter three-necked flask fitted with mechanical stirrer, condenser and thermometer maintained under an argon atmosphere were added 3.6 grams (0.025 mole) of 1,3-diiminoisoindolene, 9.6 grams (0.075 mole) of o-phthalonitrile, 75 milliliters (80 weight percent) of N-methyl pyrrolidone and 7.11 grams (0.025 mole) of titanium tetrapropoxide (all the aforementioned reagents were obtained from Aldrich Chemical Company except the phthalonitrile which was obtained from BASF). The resulting mixture (20 weight percent of solids) was stirred and warmed to reflux (about 198° C.) for 2 hours. The resultant black suspension was cooled to about 160° C. then was filtered by suction through a 350 milliliter, M-porosity sintered glass funnel which had been preheated with boiling, 150° C., dimethyl formamide (DMF). The solid TiOPc I product resulting was washed with two 150 milliliter portions of boiling DMF and the filtrate, initially black, became a light blue-green color. The solid was slurried in the funnel with 150 milliliters of boiling DMF and the suspension was filtered. The resulting solid was washed in the funnel with 150 milliliters of DMF at 25° C. then with 50 milliliters of methanol. The resultant shiny dark blue solid was dried at 70° C. overnight to yield 10.9 grams (76 percent) of pigment which was identified as Type I TiOPc on the basis of its X-ray powder diffraction trace. All X-ray powder diffraction traces were obtained using a Phillips Model 1710 X-ray Powder Diffractometer equipped with a graphite monochrometer and pulse height analyzer. X-radiation of the CuKα wavelength ($\lambda=0.1542$ nanometer) was used and all samples were finely ground with a mortar and pestle before loading into a standard powder diffraction holder. Elemental analysis of the product indicated: C, 66.54; H, 2.60; N, 20.31; and Ash (TiO2), 13.76. TiOPc requires (Theory): C, 66.67; H, 2.80; N, 19.44; Ash, and 13.86.

This product had a crystal size or average diameter of about 50 microns as determined by SEM and a caliper with the crystal shape being tightly clustered aggregates of smaller crystallites. The washing and filtration steps were carried out rapidly with only about 5 minutes being selected to effect each DMF wash.

Particle sizes of titanyl phthalocyanine products obtained with the processes of the present invention in embodiments thereof can be from about 30 to about 100 microns in length, and from about 10 to about 50 microns in width as measured by SEM or TEM and a caliper.

EXAMPLE V

Preparation of Type IV Titanyl Phthalocyanine (I to IV):

Two grams of Type I TiOPc was dissolved in 20 milliliters of a mixture of trifluoroacetic acid and methylene chloride (1:4, v/v), and added over a 2 minute period to a rapidly stirred solution of methanol (50 milliliters) and water (150 milliliters). The resultant coarse suspension was stirred at room temperature for 45 minutes then was allowed to settle. The supernatant liquid was decanted and the blue residue was redispersed in 100 milliliters of methanol by stirring for 30 minutes. The suspension was filtered using a 7 centimeters diameter glass fiber filter in a porcelain funnel. The solid was then twice redispersed in 100 milliliters of hot (about 90° C.) deionized water and filtered by vacuum filtration through a 7 centimeter diameter porcelain funnel which was fitted with a Whatman 934-AH grade filter fiber. Finally, the solid, which was identified as Type IV titanyl phthalocyanine on the basis of its XRPD spectrum, was redispersed in 100 milliliters of monochlorobenzene, filtered and oven dried at a temperature of 70° C. for a period of 1 hour to provide 1.6 grams of a powdery blue pigment which was identified as Type IV titanyl phthalocyanine by XRPD.

The Type IV pigment prepared was selected as the photogenerator in a layered imaging member of Example II providing an average dark decay of 31 volts per second, and an average $E_{\frac{1}{2}}=1.3$ ergs/cm$^2$. Discharge at 5 and 10 ergs/cm$^2$ was 81 and 87 percent, respectively.

EXAMPLE VI

Preparation of Type IV TiOPc: (I to X to IV)

Two grams of Type I TiOPc, prepared as described in Example I, were dissolved in 20 milliliters of a mixture of trifluoroacetic acid and methylene chloride (1:4, v/v), and added over a 2 minute period to a rapidly stirred solution of methanol (100 milliliters) and water (100 milliliters). The resultant coarse suspension was stirred at room temperature, about 25° C. for 45 minutes then was allowed to settle. The supernatant liquid was decanted and the blue residue was redispersed in 100 milliliters of methanol by stirring for 30 minutes. The suspension was filtered using a 7 centimeter diameter glass fiber filter in a porcelain funnel. The solid was then twice redispersed in 100 milliliters of hot (about 90° C.) deionized water and filtered by vacuum filtration through a 7 centimeter diameter porcelain funnel which was fitted with a Whatman 934-AH grade filter fiber. Finally, the solid, which was identified as Type X titanyl phthalocyanine on the basis of its XRPD spectrum, was redispersed in 100 milliliters of monochlorobenzene, filtered and oven dried at a temperature of 70° C. for a period of 1 hour to provide 1.6 grams of a powdery blue pigment which was identified as Type IV titanyl phthalocyanine by XRPD.

The Type IV pigment prepared was selected as the photogenerator in a layered imaging member of Example II. This pigment was evaluated in two separate, but substantially identical layered imaging members of Example II evidencing a dark decay of 15 volts per second, and an average $E_{\frac{1}{2}}=0.8$ ergs/cm$^2$. Discharge at 5 and 10 ergs/cm$^2$ was 87 and 90 percent, respectively.

EXAMPLE VII

Preparation of Type IV TiOPc

A titanyl phthalocyanine Type I pigment was prepared as described in Example I, except that the solvent used for the final wash step was methylene chloride.

The resulting Type IV pigment was selected for use as a photogenerator in the layered imaging member of Example II. The pigment was evaluated in two separate but substantially identical layered imaging members of Example II, evidencing an average dark decay of 16 volts per second, and average $E_{\frac{1}{2}}=1.0$ ergs/cm$^2$. Discharge at 5 and 10 ergs/cm$^2$ was 86 and 90 percent, respectively.

EXAMPLE VIII

Preparation of Type IV TiOPc

A titanyl phthalocyanine Type I pigment was prepared as described in Example I, except that the solvent used for the final wash step was tetrahydrofuran.

The resulting Type IV pigment prepared in this Example was selected for use as a photogenerator in the layered imaging member of Example II. The pigment was evaluated in two separate but substantial identical imaging members as prepared above, reference Example II, evidencing an average dark decay of 11 volts per second, and $E_{\frac{1}{2}}=0.9$ ergs/cm$^2$. Discharge at 5 and 10 ergs/cm$^2$ was 86 and 90 percent, respectively.

EXAMPLE IX

Preparation of Type IV TiOPc

A titanyl phthalocyanine Type I pigment was prepared as described in Example I, except that the solvent used for the final wash step was 1,2,4-trichlorobenzene.

The resulting Type IV pigment was selected for use as a photogenerator in the layered imaging member of Example II. The pigment was evaluated in two separate but substantially identical imaging members as prepared above, reference Example II, evidencing an average dark decay of 12 volts per second, and an average $E_{\frac{1}{2}}=1.2$ ergs/cm$^2$. Discharge at 5 and 10 ergs/cm$^2$ was 84 and 88 percent, respectively.

EXAMPLE X

Preparation of Type IV TiOPc:

A titanyl phthalocyanine Type I pigment was prepared as described in Example I, except that the solvent used for the final wash step was 1,1,2-trichloroethane.

The resulting Type IV pigment was selected as a photogenerator in the layered imaging member of Example II. The pigment was evaluated in two separate but substantially identical imaging members as prepared above, reference Example II, evidencing an average dark decay of 11 volts per second, and an average $E_{\frac{1}{2}}=1.1$ ergs/cm$^2$. Discharge at 5 and 10 ergs/cm$^2$ was 84 and 88 percent, respectively.

EXAMPLE XI

Preparation of Type IV TiOPc

A titanyl phthalocyanine Type I pigment was prepared as described in Example I, except that the solvent used for the final wash step was bromobenzene.

The resulting Type IV pigment prepared was selected as a photogenerator in the layered imaging member of Example II. The pigment was evaluated in two separate but substantially identical imaging members as prepared above, reference Example II, indicating an average dark decay of 13 volts per second, and an average $E_{\frac{1}{2}}=1.0$ ergs/cm². Discharge at 5 and 10 ergs/cm² was 84 and 88 percent, respectively.

The results of the evaluation of the two imaging members presented in the Examples represents an average thereof, that is the data for each imaging member was added and divided by two.

In embodiments, the titanyl phthalocyanine halobenzene, especially chlorobenzene slurry, is retained for an effective period of time, for example from about 1 to about 24 hours.

TABLE 4

| Example | Device | Titanium Salt | Reaction Solvent | Dark Decay (v/s) | % Discharge @ 5 ergs/cm² | % Discharge @ 10 ergs/cm² | $E_{\frac{1}{2}}$ (ergs/cm²) | Vddp (volt) |
|---|---|---|---|---|---|---|---|---|
| V | 1 | Ti(OPr)₄ | NMP | 17–19 | 84.0 | 87.5 | 1.0 | −804 to −819 |
|   |   |   |   | 16–20 | 84.0 | 88.0 | 1.1 | −719 to −802 |
|   | 2 |   |   | 15–17 | 82.0 | 86.0 | 1.1 | −812 to −823 |
|   |   |   |   | 13–15 | 82.5 | 87.0 | 1.2 | −812 to −818 |
| IV | 1 | Ti(OBu)₄ | NMP | 13–16 | 86.0 | 89.5 | 1.0 | −800 to −829 |
|   |   |   |   | 13–15 | 87.0 | 90.0 | 0.9 | −817 to −823 |
|   | 2 |   |   | 11–16 | 85.5 | 89.0 | 1.0 | −822 to −839 |
|   |   |   |   | 11–13 | 85.0 | 89.0 | 0.9 | −812 to −821 |
| III | 1 | Ti(OPr)₄ | ClNp | 20–22 | 88.0 | 90.0 | 0.9 | −799 to −802 |
|   |   |   |   | 18–21 | 88.0 | 91.0 | 0.9 | −800 to −818 |
|   | 2 |   |   | 12–18 | 87.5 | 90.5 | 0.7 | −806 to −837 |
|   |   |   |   | 11–14 | 87.0 | 90.0 | 0.8 | −808 to −823 |
| I | 1 | Ti(OBu)₄ | ClNp | 18–21 | 87.0 | 90.0 | 0.8 | −796 to −810 |
|   |   |   |   | 18–19 | 87.5 | 90.0 | 0.8 | −800 to −806 |
|   | 2 |   |   | 12–14 | 87.0 | 89.5 | 0.9 | −808 to −821 |
|   |   |   |   | 12–16 | 87.0 | 90.0 | 0.8 | −806 to −841 |

Other modifications of the present invention may occur to those skilled in the art based upon a review of the present application and these modifications, including equivalents thereof, are intended to be included within the scope of the present invention.

What is claimed is:

1. A process for the preparation of titanyl phthalocyanine Type IV consisting of the treatment of titanyl phthalocyanine Type X with halobenzene at room temperature.

2. A process in accordance with claim 1 wherein the halobenzene is chlorobenzene.

3. A process for the preparation of titanyl phthalocyanine Type IV consisting of dissolving Type I titanyl phthalocyanine in a mixture of trihaloacetic acid and an alkylene halide; adding the aforementioned dissolved solution to a solution containing in a 1:1 ratio an aliphatic alcohol and water; isolating Type X titanyl phthalocyanine from said aliphatic alcohol solution, and wherein said aliphatic alcohol contains from 1 to 6 carbon atoms; subsequently washing the Type X obtained with aliphatic alcohol; thereafter dispersing the Type X in a halobenzene at room temperature; and isolating Type IV titanyl phthalocyanine.

4. A process in accordance with claim 3 wherein the halobenzene is chlorobenzene.

5. A process in accordance with claim 3 wherein said mixture is comprised of trifluoroacetic acid and methylene chloride.

6. A process in accordance with claim 3 wherein washing is accomplished with methanol.

7. A process in accordance with claim 3 wherein washing is accomplished with methanol, followed by washing with heated water.

8. A process in accordance with claim 7 wherein the water is heated to a temperature of from about 80° to about 100° C.

9. A process in accordance with claim 3 wherein subsequent to isolation the Type IV titanyl phthalocyanine is dried.

10. A process in accordance with claim 9 wherein drying is accomplished in an oven.

11. A process in accordance with claim 9 wherein drying is in air heated at a temperature of from about 50° to about 250° C.

12. A process for the preparation of titanyl phthalocyanine Type IV consisting of the addition in a solvent of titanium tetraalkoxide to a mixture of phthalonitrile and 1,3-diiminoisoindolene, heating said mixture, followed by separation of the titanyl phthalocyanine Type I product by filtration, washing with dimethylformamide and thereafter drying; dissolving the Type I titanyl phthalocyanine obtained in a solution of trihaloacetic acid and an alkylene halide; adding the resulting solution containing in a 1:1 ratio an aliphatic alcohol and water, and wherein said aliphatic alcohol contains from 1 to 6 carbon atoms; separating the titanyl phthalocyanine product therefrom; adding the separated product to water followed by separation of the product therefrom; dispersing the product titanyl phthalocyanine Type X obtained in a halobenzene solvent at room temperature followed by separation and drying thereof of the titanyl phthalocyanine Type IV obtained.

13. A process for the preparation of titanyl phthalocyanine Type IV which consists of the addition in a solvent of titanium tetraalkoxide to 1,3-diiminoisoindolene, heating said mixture, followed by separation of the titanyl phthalocyanine Type I product by filtration, washing and drying; dissolving the Type I titanyl phthalocyanine obtained in a solution of trihaloacetic acid and an alkylene halide; adding the resulting solution to a solution containing in a 1:1 ratio an aliphatic alcohol and water, and wherein said aliphatic alcohol contains from 1 to 6 carbon atoms; separating the titanyl phthalocyanine product therefrom; adding the separated product to water followed by separation of the product therefrom; dispersing the product titanyl phthalocyanine Type X obtained in a halobenzene solvent at room temperature followed by separation and drying thereof of the titanyl phthalocyanine Type IV obtained.

14. A process in accordance with claim 12 wherein the titanium tetraalkoxide is titanium tetrabutoxide.

15. A process in accordance with claim 12 wherein the titanium tetraalkoxide is titanium tetrapropoxide.

16. A process in accordance with claim 13 wherein the titanium tetraalkoxide is titanium tetrabutoxide.

17. A process in accordance with claim 13 wherein the titanium tetraalkoxide is titanium tetrapropoxide.

18. A process in accordance with claim 12 wherein the phthalonitrile is ortho-phthalonitrile.

19. A process in accordance with claim 12 wherein the diiminoisoindolene is 1,3,diiminoisoindolene.

20. A process in accordance with claim 13 wherein the diiminoisoindolene is 1,3, diiminoisoindolene.

21. A process in accordance with claim 13 wherein the diiminoisoindolene is added in an amount of from about 1 part to about 10 parts for each part of titanium tetraalkoxide that is selected on a molar basis.

22. A process in accordance with claim 14 wherein the diiminoisoindolene is added in an amount of about 4 parts for each part of titanium tetrabutoxide that is selected on a molar basis.

23. A process in accordance with claim 12 wherein the halobenzene is chlorobenzene.

24. A process in accordance with claim 13 wherein the product titanyl phthalocyanine is comprised of relatively large rectangular aggregated titanyl phthalocyanine crystals of titanyl phthalocyanine pigment of about 50 to about 100 microns in length and about 20 to about 50 microns in width.

25. A process in accordance with claim 13 wherein the product titanyl phthalocyanine is comprised of relatively large rectangular aggregated titanyl phthalocyanine crystals of titanyl phthalocyanine pigment of about 70 microns in length and about 30 microns in width.

26. A process in accordance with claim 12 wherein the combined amount of diiminoisoindolene and titanium tetraalkoxide selected is from about 5 to about 40 weight percent of the total weight of reactants selected.

27. A process in accordance with claim 13 wherein the combined amount of diiminoisoindolene and titanium tetrabutoxide selected is from about 15 to about 25 percent of the total weight of reactants selected.

28. A process in accordance with claim 13 which comprises heating and maintaining the reaction mixture at reflux temperature while removing the byproduct alcohol by distillation.

29. A process in accordance with claim 28 wherein the byproducts is removed when the reaction mixture attains a temperature of from about 150° to about 230° C.

30. A process in accordance with claim 28 wherein following the attainment of the reflux temperature of about 200 degrees the reaction mixture is maintained at this temperature for a period of from about 0.5 to about 8 hours.

31. A process in accordance with claim 28 wherein following the attainment of the reflux temperature of about 200 degrees the reaction mixture is maintained at this temperature for about 2 hours.

32. A process for the preparation of titanyl phthalocyanine Type IV which consists of adding titanium tetrabutoxide to 1,3-diiminoisoindolene in a 1-chloronaphthalene solvent; heating said mixture to reflux temperature of from about 130 degrees to about 180 degrees; removing any volatile byproducts by distillation thereby increasing the reflux temperature from about 180° to about 200° C.; maintaining the reaction mixture at said temperature for a time period of from about 0.5 to about 8 hours; followed by cooling of the reaction mixture to a temperature of from about 130° to about 180° C. by removal of the heat source; and filtering said hot mixture to separate the solid titanyl phthalocyanine Type I product; admixing the Type I obtained in a solution of trifluoroacetic acid and methylene chloride; isolating Type X titanyl phthalocyanine; admixing the Type X with a halobenzene at room temperature; and separating Type IV titanyl phthalocyanine therefrom.

33. A process in accordance with claim 32 wherein the washed titanyl phthalocyanine pigment product is dried at ambient pressure or under a vacuum at a temperature of from about 50° to about 200° C. for a time of from about 0.5 to 48 about hours.

34. A process in accordance with claim 32 wherein the water is present in an amount of from about 10 volume parts to about 100 volume parts per weight of titanyl phthalocyanine that was dissolved.

35. A process in accordance with claim 34 wherein washing is affected with hot water until the conductivity of the filtrate is less than 20 $\mu$S (microsiemans).

36. A process in accordance with claim 32 wherein the halobenzene is chlorobenzene.

37. A process for the preparation of titanyl phthalocyanine Type IV consisting of dissolving Type I titanyl phthalocyanine in a mixture of trihaloacetic acid and an alkylene halide in a ratio of from about 1 volume part of acid to about 1 volume part of halide to about 1 volume part of acid to about 10 volume parts of halide; adding the aforementioned dissolved solution to a solution containing in a 1:1 ratio an aliphatic alcohol and water; isolating Type X titanyl phthalocyanine from said aliphatic alcohol solution; subsequently washing the Type X obtained with aliphatic alcohol, and then heated water; thereafter dispersing the Type X in a halobenzene at room temperature; and isolating Type IV titanyl phthalocyanine, and wherein said aliphatic alcohol contains from 1 to 6 carbon atoms.

38. A process in accordance with claim 37 wherein there is selected trifluoroacetic acid, methylene chloride, about 50 percent alcohol and about 50 percent water, and as the halobenzene chlorobenzene.

39. A process in accordance with claim 38 wherein the alcohol is methanol.

* * * * *